US012675715B1

(12) United States Patent
Stephen et al.

(10) Patent No.: US 12,675,715 B1
(45) Date of Patent: Jul. 7, 2026

(54) METHOD AND SYSTEM FOR MEMORY MANAGEMENT WITHIN MACHINE LEARNING INFERENCE ENGINE

(71) Applicant: Marvell Asia Pte Ltd, Singapore (SG)

(72) Inventors: Nikhil Bernard John Stephen, Sunnyvale, CA (US); Senad Durakovic, Palo Alto, CA (US); Chien-Chun Chou, Morgan Hill, CA (US); Pranav Jonnalagadda, San Jose, CA (US); Ulf Hanebutte, Gig Harbor, WA (US)

(73) Assignee: Marvell Asia Pte Ltd, Singapore (SG)

( * ) Notice: Subject to any disclaimer, the term of this patent is extended or adjusted under 35 U.S.C. 154(b) by 530 days.

(21) Appl. No.: 18/226,725

(22) Filed: Jul. 26, 2023

Related U.S. Application Data

(60) Provisional application No. 63/467,915, filed on May 19, 2023.

(51) Int. Cl.
*G06N 5/046* (2023.01)
*G06F 8/41* (2018.01)

(52) U.S. Cl.
CPC ............... *G06N 5/046* (2013.01); *G06F 8/41* (2013.01)

(58) Field of Classification Search
CPC .................................. G06N 5/046; G06F 8/41
See application file for complete search history.

(56) References Cited

U.S. PATENT DOCUMENTS

| | | | |
|---|---|---|---|
| 11,467,992 B1 | 10/2022 | Kaplan et al. | |
| 11,977,475 B1 | 5/2024 | Chou et al. | |
| 12,190,086 B1 * | 1/2025 | Hanebutte | G06F 16/9024 |
| 12,518,322 B1 * | 1/2026 | Hill | G06Q 40/08 |
| 2010/0169553 A1 * | 7/2010 | Yano | G06F 12/0246 711/E12.001 |
| 2019/0018785 A1 | 1/2019 | Beard et al. | |
| 2019/0180170 A1 | 6/2019 | Huang et al. | |

(Continued)

FOREIGN PATENT DOCUMENTS

| | | | |
|---|---|---|---|
| CN | 115525287 A | 12/2022 | |
| WO | WO-2021257150 A1 * | 12/2021 | G06F 8/4434 |

OTHER PUBLICATIONS

U.S. Appl. No. 17/966,380, filed Oct. 14, 2022, Ulf Hanebutte.
U.S. Appl. No. 18/226,719, filed Jul. 26, 2023, Nikhil Bernard John Stephen.

*Primary Examiner* — Ryan Barrett

(57) ABSTRACT

A method includes in a first iteration receiving a machine learning (ML) network model comprising a plurality of ML operations in high-level code; generating an internal representation (IR) for the ML network model, the IR mapped to one or more components in a multi-processing tile device; generating primitive functions based on the IR; generating an allocation list based on the primitive functions; determining when a tensor data within the allocation list is no longer needed; and inserting a deallocation function associated with the tensor data to the primitive functions to form an updated primitive functions, the inserting frees up a memory space associated with the tensor data when the tensor is no longer needed; and in a second iteration generating a compilation of the updated primitive functions to map the IR to the one or more components in the multi-processing device, wherein the compilation is a low-level instructions.

31 Claims, 35 Drawing Sheets

(56)  References Cited

U.S. PATENT DOCUMENTS

| | | | |
|---|---|---|---|
| 2019/0180183 A1 | 6/2019 | Diamant et al. | |
| 2020/0249998 A1 | 8/2020 | Che et al. | |
| 2020/0285579 A1 | 9/2020 | Chen et al. | |
| 2021/0240611 A1 | 8/2021 | Tumanova et al. | |
| 2022/0083272 A1* | 3/2022 | Imamura | G06F 3/0625 |
| 2022/0092465 A1 | 3/2022 | Moss | |
| 2022/0206876 A1* | 6/2022 | Beckmann | G06F 9/524 |
| 2023/0123811 A1 | 4/2023 | Collins et al. | |
| 2023/0315407 A1 | 10/2023 | Yang et al. | |
| 2023/0315414 A1 | 10/2023 | Yang et al. | |
| 2023/0333999 A1* | 10/2023 | Omer | G06F 13/28 |
| 2024/0193784 A1* | 6/2024 | Song | G06V 20/698 |

* cited by examiner

Primitive Function
222

Memory Space 701 | Memory Space 702 | Free Space 703 | Memory Space 704 | Free Space 705 | Memory Space 706 | Free Space 707

Subtask: Remove

Memory Space 701 | Memory Space 702 | Free Space 703 | Memory Space 704 | Free Space 705 | Memory Space 706 | Free Space 707

Subtask: Remove

Memory Space 701 | Memory Space 702 | Free Space 703 | Memory Space 704 | Free Space 705 | Memory Space 706 | Free Space 707

Main Operation: Delete

Memory Space 701

Memory Space 702

Free Space 713

Memory Space 706

Free Space 707

Subtask: Add Free Space

Memory Space 701

Memory Space 702

Free Space 703

Memory Space 704

Free Space 705

Memory Space 706

Free Space 707

Subtask: Remove

OCM0 Start
Address
250A

Memory Space
251

Memory Space
252

Free Space
253

Memory Space
254

Free Space
255

Memory Space
256

Grouped Memory
Space
570A

Free Space
551

Memory Space
258

Free Space
259

OCM0 End
Address
250B

DDR
820

Free Memory
Space
810

Figure 3 C to this

OCM0 Start
Address
250A

Memory Space
251

Memory Space
252

Free Memory
Space
1310

Free Space
1312

Grouped Memory
Space
570A

Free Space
551

Memory Space
258

Memory Space
256A

Memory Space
254C

Free Space
259A

OCM0 End
Address
250B

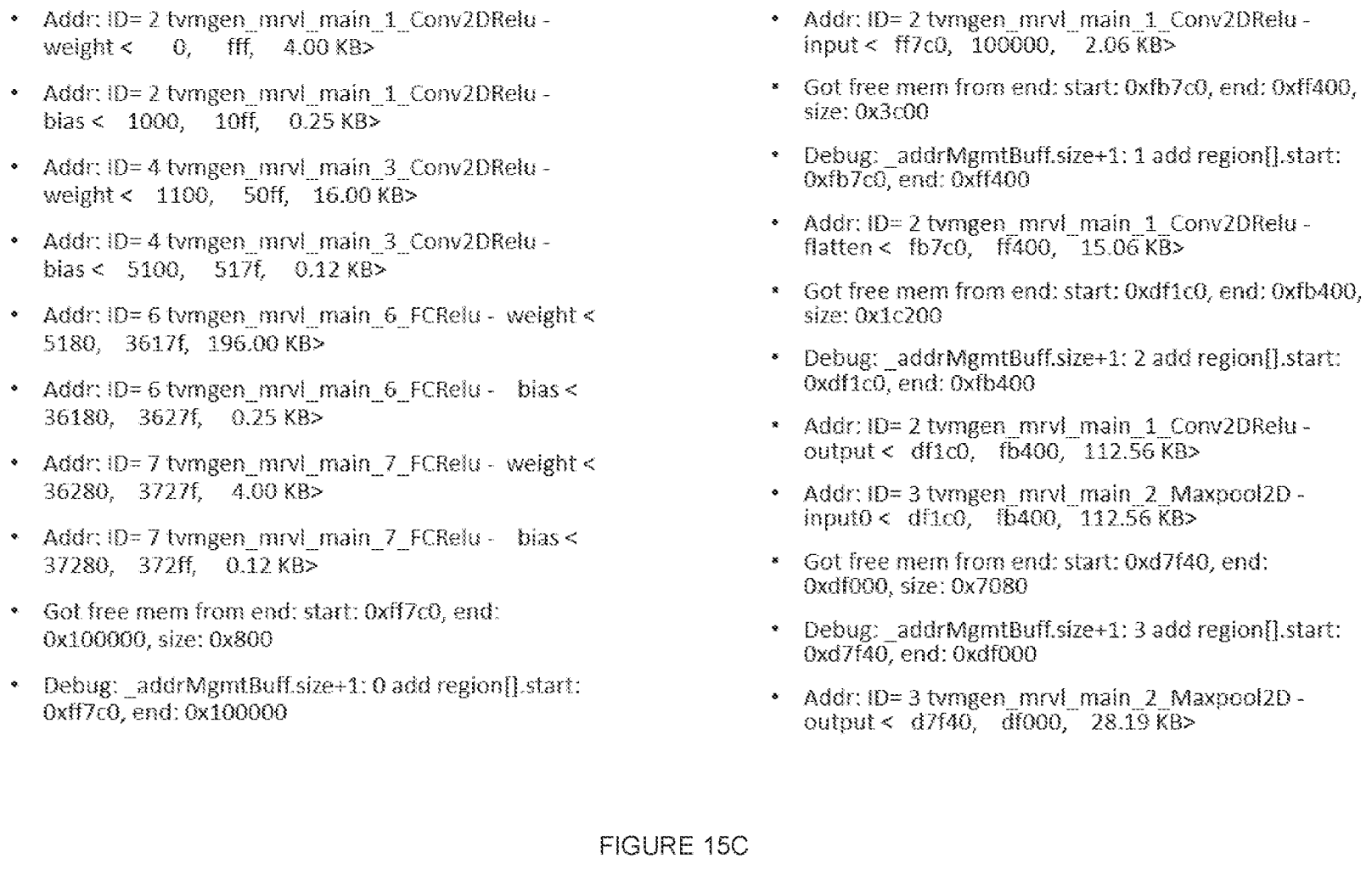

- Addr: ID= 2 tvmgen_mrvl_main_1_Conv2DRelu - weight < 0, fff, 4.00 KB>
- Addr: ID= 2 tvmgen_mrvl_main_1_Conv2DRelu - bias < 1000, 10ff, 0.25 KB>
- Addr: ID= 4 tvmgen_mrvl_main_3_Conv2DRelu - weight < 1100, 50ff, 16.00 KB>
- Addr: ID= 4 tvmgen_mrvl_main_3_Conv2DRelu - bias < 5100, 517f, 0.12 KB>
- Addr: ID= 6 tvmgen_mrvl_main_6_FCRelu - weight < 5180, 3617f, 196.00 KB>
- Addr: ID= 6 tvmgen_mrvl_main_6_FCRelu - bias < 36180, 3627f, 0.25 KB>
- Addr: ID= 7 tvmgen_mrvl_main_7_FCRelu - weight < 36280, 3727f, 4.00 KB>
- Addr: ID= 7 tvmgen_mrvl_main_7_FCRelu - bias < 37280, 372ff, 0.12 KB>
- Got free mem from end: start: 0xff7c0, end: 0x100000, size: 0x800
- Debug: _addrMgmtBuff.size+1: 0 add region[].start: 0xff7c0, end: 0x100000

- Addr: ID= 2 tvmgen_mrvl_main_1_Conv2DRelu - input < ff7c0, 100000, 2.06 KB>
- Got free mem from end: start: 0xfb7c0, end: 0xff400, size: 0x3c00
- Debug: _addrMgmtBuff.size+1: 1 add region[].start: 0xfb7c0, end: 0xff400
- Addr: ID= 2 tvmgen_mrvl_main_1_Conv2DRelu - flatten < fb7c0, ff400, 15.06 KB>
- Got free mem from end: start: 0xdf1c0, end: 0xfb400, size: 0x1c200
- Debug: _addrMgmtBuff.size+1: 2 add region[].start: 0xdf1c0, end: 0xfb400
- Addr: ID= 2 tvmgen_mrvl_main_1_Conv2DRelu - output < df1c0, fb400, 112.56 KB>
- Addr: ID= 3 tvmgen_mrvl_main_2_Maxpool2D - input0 < df1c0, fb400, 112.56 KB>
- Got free mem from end: start: 0xd7f40, end: 0xdf000, size: 0x70B0
- Debug: _addrMgmtBuff.size+1: 3 add region[].start: 0xd7f40, end: 0xdf080
- Addr: ID= 3 tvmgen_mrvl_main_2_Maxpool2D - output < d7f40, df080, 28.19 KB>

FIGURE 15C

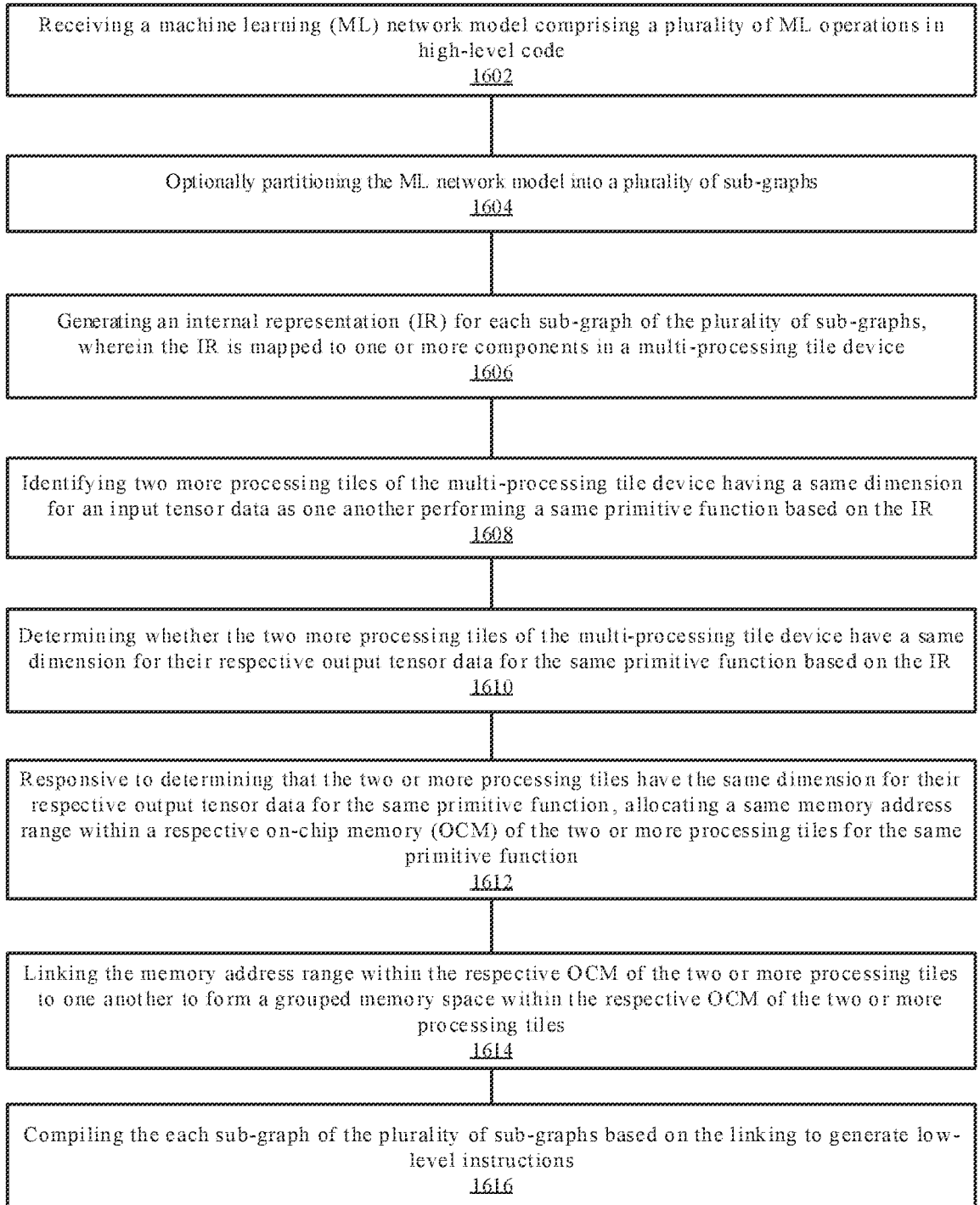

Receiving a machine learning (ML) network model comprising a plurality of ML operations in high-level code
1602

Optionally partitioning the ML network model into a plurality of sub-graphs
1604

Generating an internal representation (IR) for each sub-graph of the plurality of sub-graphs, wherein the IR is mapped to one or more components in a multi-processing tile device
1606

Identifying two more processing tiles of the multi-processing tile device having a same dimension for an input tensor data as one another performing a same primitive function based on the IR
1608

Determining whether the two more processing tiles of the multi-processing tile device have a same dimension for their respective output tensor data for the same primitive function based on the IR
1610

Responsive to determining that the two or more processing tiles have the same dimension for their respective output tensor data for the same primitive function, allocating a same memory address range within a respective on-chip memory (OCM) of the two or more processing tiles for the same primitive function
1612

Linking the memory address range within the respective OCM of the two or more processing tiles to one another to form a grouped memory space within the respective OCM of the two or more processing tiles
1614

Compiling the each sub-graph of the plurality of sub-graphs based on the linking to generate low-level instructions
1616

FIGURE 16

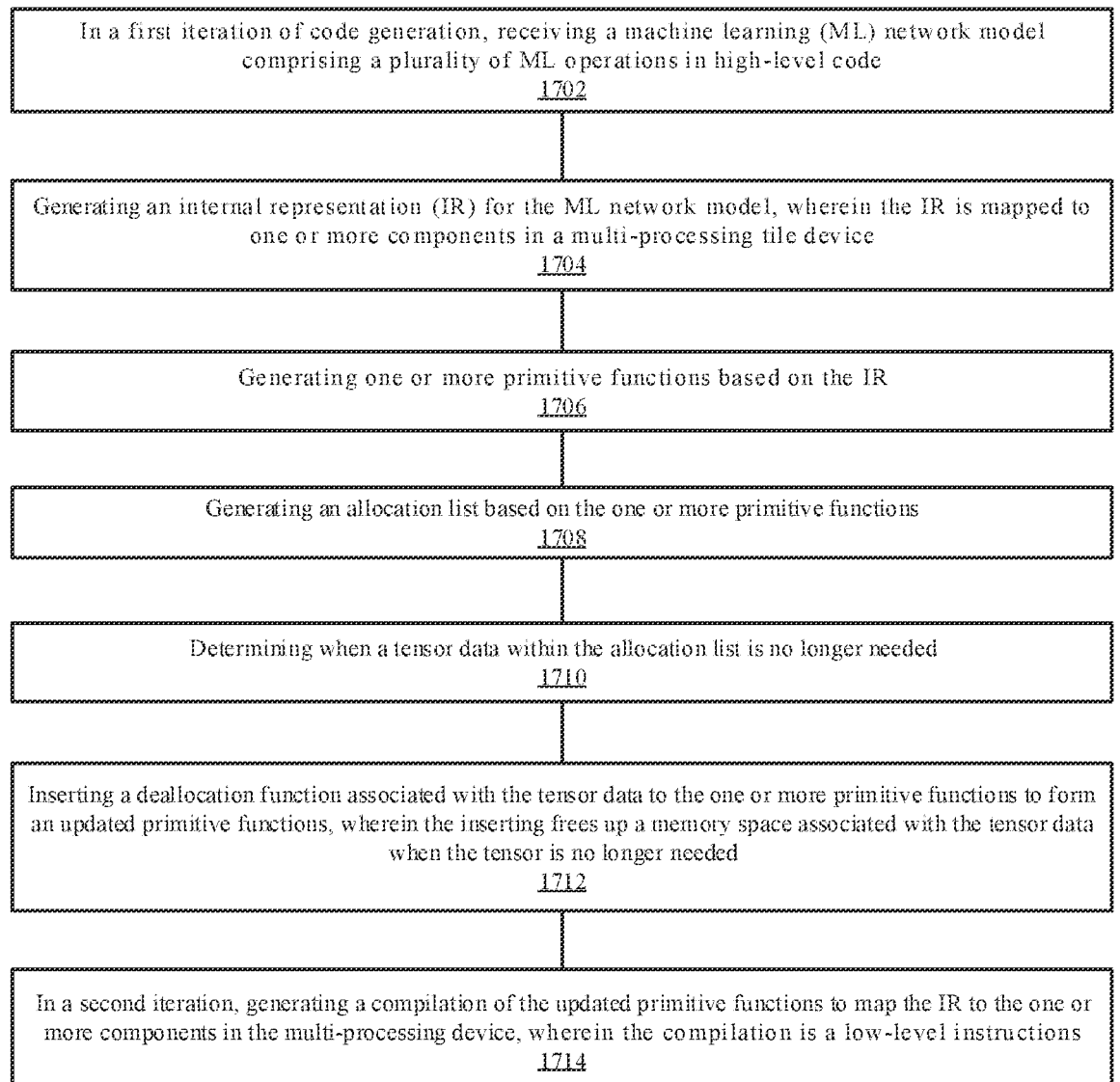

In a first iteration of code generation, receiving a machine learning (ML) network model comprising a plurality of ML operations in high-level code
1702

Generating an internal representation (IR) for the ML network model, wherein the IR is mapped to one or more components in a multi-processing tile device
1704

Generating one or more primitive functions based on the IR
1706

Generating an allocation list based on the one or more primitive functions
1708

Determining when a tensor data within the allocation list is no longer needed
1710

Inserting a deallocation function associated with the tensor data to the one or more primitive functions to form an updated primitive functions, wherein the inserting frees up a memory space associated with the tensor data when the tensor is no longer needed
1712

In a second iteration, generating a compilation of the updated primitive functions to map the IR to the one or more components in the multi-processing device, wherein the compilation is a low-level instructions
1714

FIGURE 17

METHOD AND SYSTEM FOR MEMORY MANAGEMENT WITHIN MACHINE LEARNING INFERENCE ENGINE

RELATED APPLICATIONS

The instant application claims the benefit and priority to the U.S. Provisional Application No. 63/467,915 filed on May 19, 2023, which is incorporated herein by reference in its entirety.

BACKGROUND

Use and implementations of machine learning (ML) and artificial intelligence (AI) methods on electronic devices have become ubiquitous. The design of a hardware architecture of an electronic device, which can be but is not limited to a processor, a programmable logic, an application specific integrated circuit (ASIC), or a dedicated ML-specific hardware, e.g., hardware accelerator, often processes different ML models for different ML applications. In general, accelerators and/or dedicated ML specific hardware have limited resources, e.g., memory space. While resources remain relatively unchanged, the data size, e.g., image size, have increased substantially. In other words, the activation tensors (i.e., input and output tensors, intermediate tensors, etc.) have increased substantially at each layer of the network.

In general, placement of tensor data within the memory hierarchy of an accelerator and/or dedicated ML specific hardware has significant impact on the achieved performance, e.g., lower latency, higher throughput, etc. Data stored on the accelerator and/or dedicated ML specific hardware has the highest bandwidth and lowest latency because the need to access external memory components to access tensors is eliminated. Unfortunately, the amount of memory resources on the accelerator and/or dedicated ML specific hardware is limited, and therefore unable to accommodate the ever-growing data sets.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 15C depicts an example of allocated list according to one aspect of the present embodiments.

FIG. 16 is a flowchart of an example for determining whether certain memory spaces from different processing tiles can be linked and memory management associated therewith according to one aspect of the present embodiments.

FIG. 17 is a flowchart of an example for deallocating a memory space when a tensor data is no longer needed according to one aspect of the present embodiments.

DETAILED DESCRIPTION

Figure 1:
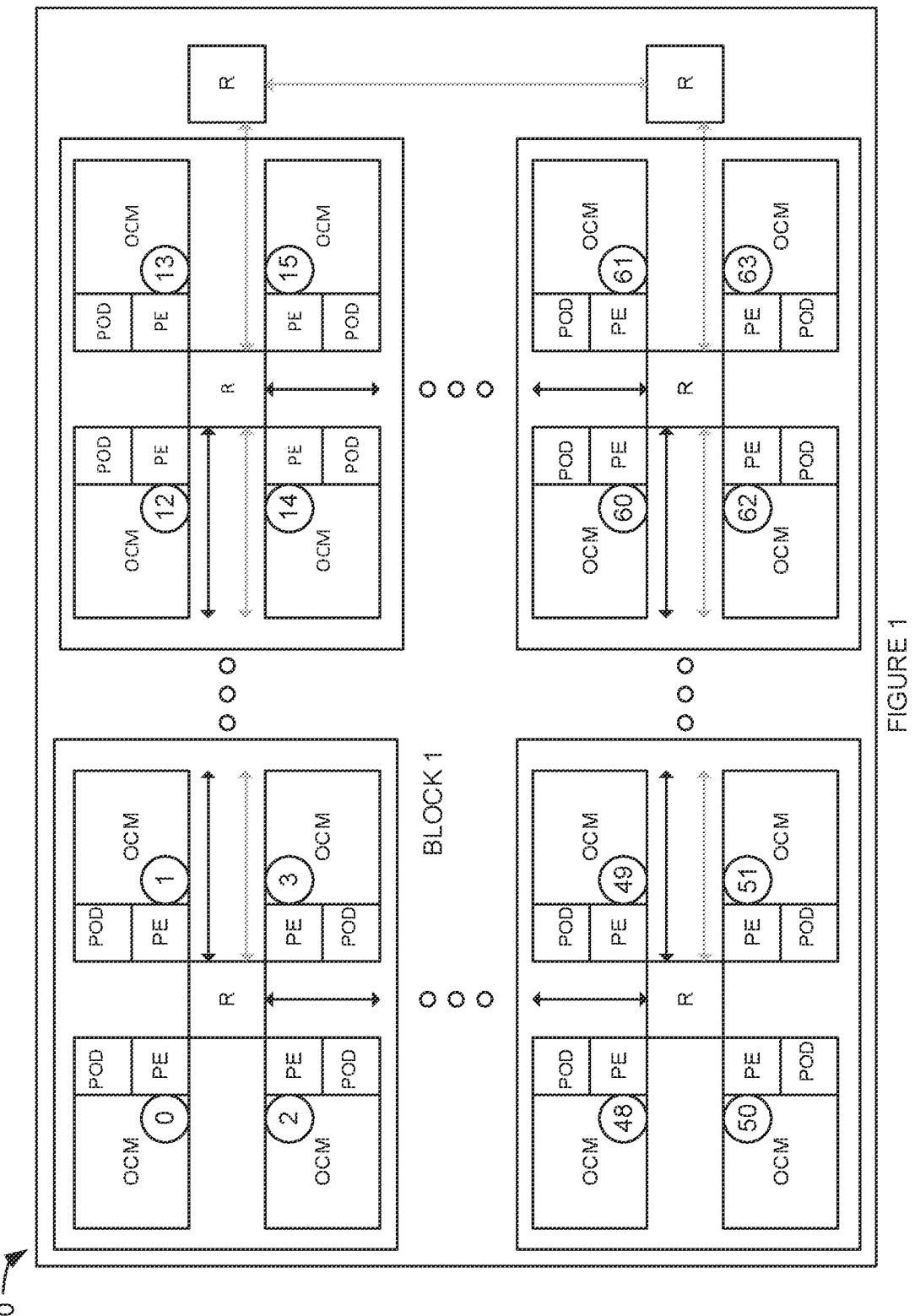
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to perform memory management for ML specific hardware to enable more data to be serviced through the ML specific hardware in order to achieve higher efficiency, e.g., lower latency, higher throughput, etc. In some embodiments, memory management may include removing data (e.g., tensor data) from memory space within a processing tile of the ML specific hardware (with multiple processing tiles where each processing tile has a set of dedicated processing elements and its dedicated local memory (on-chip memory (OCM) such as static random access memory (SRAM))) that is no longer needed to free up the memory space for other data. It is appreciated that the embodiments are described with respect to content being removed and generally refer to clearing record of the tensor data from the memory management system, thereby enabling the memory space to be overwritten. In some embodiments, memory management may include moving memory spaces (e.g., free memory space, in use memory spaces, etc.) around (e.g., up/down) in order to create a larger continuous memory space that can be used to accommodate more data. According to some embodiments, memory management may include moving data from certain memory space to a secondary memory component based on certain prioritization (e.g., non-grouped memory space is prioritized for moving over grouped memory spaces which are described later).

In yet some embodiments, a memory engine may be used in conjunction with other components of a compiler (e.g., code generator sequence, primitive code generator, a library module, etc.) to determine whether a particular primitive function being executed by two or more processing tiles has the same dimension for their input tensors and the same dimension for their respective output tensors and responsive to this determination, linking the memory spaces within the OCM of respective processing tiles together. For example, if it is determined that one primitive function is to be executed by processing tile numbers seven and thirteen, the dimension for the input tensors for the primitive function to be executed by the seventh and thirteenth processing tiles are the same and further the dimension for the output tensors for the primitive function to be executed by the seventh and thirteenth processing tiles are the same. The memory engine may link a memory space for the OCM on the seventh processing tile to the memory space for the OCM on the thirteenth processing tile to create a grouped memory space within each processing tile, such that their respective starting and ending addresses are the same as one another. As such, when the primitive function is transmitted to the ML specific hardware for execution, it can be sent to both processing tiles without any changes because the primitive function is the same, the starting address of each OCM is the same, the ending address of each OCM is the same. It is appreciated that while the primitive function is the same and the starting and ending addresses are the same for both processing tiles, they may operate on different data content because the data stored in each memory space may be different even through their starting and ending addresses are the same. It is appreciated that the memory spaces once linked are synchronized to one another, e.g., when one grouped memory address is moved the other is moved too, when one grouped memory address is moved to a secondary memory the other grouped memory address is also moved to the secondary memory, etc.

Conventionally, there has been no need to remove unneeded data from memory spaces because conventional systems, e.g., central processing units, graphics pipeline unit (GPU), etc., traditionally have large memory spaces. However, memory space such as OCM within ML specific hardware is limited, yet the amount of data has increased substantially. As such, there is a need to remove unneeded data from OCMs of one or more processing tiles in order to accommodate new data, e.g., tensor data. One proposed embodiment, utilizes the compiler to determine when a particular data, e.g., tensor data, is no longer needed and that can be removed from the OCM of the one or more processing tiles. In a first iteration, an internal representation (IR) of an ML model may be generated. The IR is used to generate one or more primitive functions associated therewith to map the IR to one or more components of the ML hardware. An allocation list may be generated from the one or more primitive functions. As such, the memory engine may determine certain tensors that are no longer needed and causes a deletion of the tensor data in the memory management system. It is appreciated that in one nonlimiting example, an instruction may be generated to deallocate a memory space associated with the certain tensors to be inserted into the one or more primitive functions. For a non-limiting example, the instruction is specified in the format of instruction set architecture (ISA) designed for the specialized ML hardware and/or efficient data processing for the ML application. It is appreciated that the primitive code generator compiles the one or more primitive functions along with the inserted ISA instruction such that certain tensor data are removed from their respective memory location after they are no longer needed. The memory space where the tensors are removed from may be used for other data, thereby eliminating the need to move data to an external memory component such as a double data rate (DDR) memory, and as such improving performance by reducing latency and increasing throughput.

For a non-limiting example, the ML hardware may include 64 processing tiles (each processing tile may further include a plurality of smaller processing elements that are described in the U.S. patent application Ser. No. 16/226,508, filed Dec. 19, 2018, now issued as the U.S. Pat. No. 11,086,633 that is incorporated herein by reference in its entirety). Each of those processing tiles is configured to receive a tensor data and an instruction (i.e., compiled SoftMax instructions, ArgMax instruction, TopK, GEMM, SUM, MUL, etc.). As such, multiple tensors may be operated on simultaneously, thereby reducing the processing time. For illustrative purposes, it is assumed that there are 64 processing tiles where each processing element is configured to process 64 elements. However, it is appreciated that any number of processing tiles may be used.

The proposed ML hardware architecture (as described in the U.S. Pat. No. 11,086,633 and as further described in FIG. 1 below) is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (e.g., POD) for performing a first type of ML (e.g., dense) operations, and a second type of processing unit (e.g., PE) for performing a second type of ML (e.g., sparse) operations. Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2A:
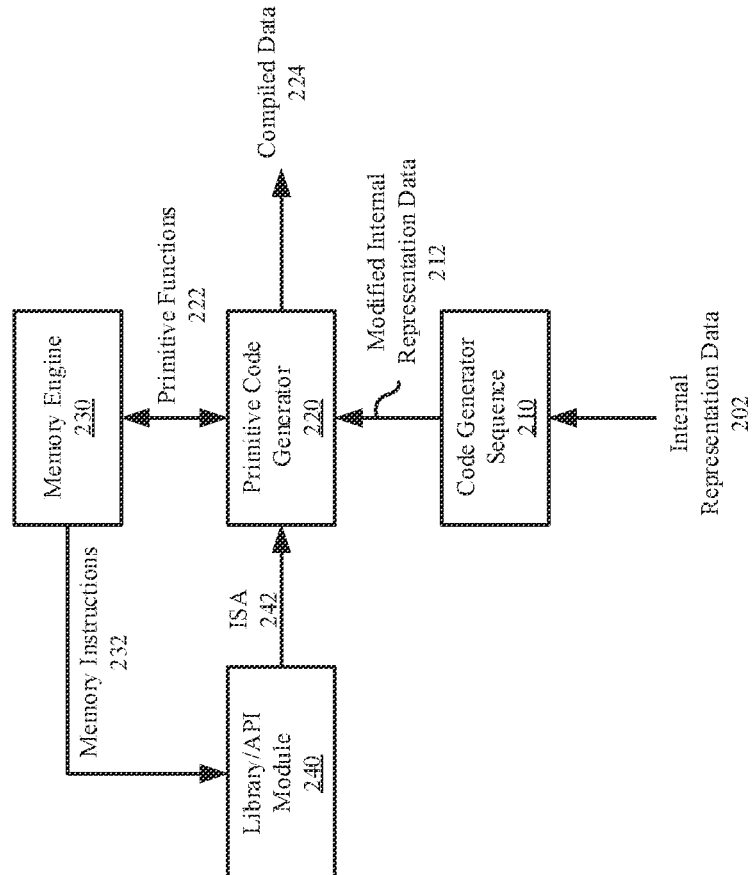
FIG. 2A depicts an example of a compiler configured to determine whether certain memory spaces from different processing tiles can be linked with one another according to one aspect of the present embodiments.
Figure 2A:

FIG. 2A depicts an example of a compiler configured to determine whether certain memory spaces from different processing tiles can be linked with one another according to one aspect of the present embodiments. The compiler 200 includes a code generator sequence 210 that receives an ML model as internal representation (IR) data 202. The ML model may be partitioned into a plurality of sub-graphs and transform the IR 202 into a modified IR data 212 may be generated and transmitted to primitive code generator 220. It is appreciated that the modified IR data 212 may include one or more transformations (which may include linking of the memory spaces) of the IR data 202 based on the architecture of the ML hardware, as described in FIG. 1. The primitive code generator 220 is configured to generate one or more primitive functions 222 from the modified IR data 212 where the primitive functions may be used to generate low-level instructions for an ML hardware similar to that described above in FIG. 1. In some embodiments the primitive functions refer to a set of functions, units, and/or operators that are basic, generic, and essential (in contrast to specialized) to the ML operations of the ML network model. Each primitive function may invoke one or more library function calls to a library/API module 240 to generate low-level instructions to be executed on a hardware, e.g., ML hardware. It is appreciated that compiling mathematical computer operations for an ML model into its central processing unit (CPU) instruction set architecture (ISA) can be done using an available library such as C++ library and system level support on a CPU machine whereas a standard/conventional library is unsuitable to generate the ISAs for target devices such as custom accelerator (e.g., ML hardware described in FIG. 1).

In some embodiments, the memory engine 230 is also used. The memory engine 230 is a specialized unit that is aware of the ML hardware architecture and is configured to track memory spaces within processing tiles of the ML hardware and is thus better suited to make memory management decisions. The memory engine 230 is configured to determine whether certain memory management functions should be performed for the ML hardware in order to improve the operation, e.g., reduce latency, increase throughput, etc. The memory engine 230 generates memory instructions 232 and transmits the memory instructions 232 to the library/API module 240 in order to generate one or more ISA instruction 242. In this nonlimiting example, the memory engine 230 may receive the primitive functions 222 from the primitive code generator 220 and determine/identify two or more processing tiles (e.g., processing tiles 3 and 61) within the ML hardware that perform the same primitive function and that have the same dimension for their respective input tensor data and the same dimension for their respective output tensor data. In response to determining/identifying processing tiles 3 and 61 that satisfy the criteria above, the memory engine 230 may send memory instructions 232 to the library/API module 240 to generate ISA 242 to link memory spaces (i.e., start address and end address for the tensor associated with the primitive function being performed by the processing tiles 3 and 61) within the OCM of processing tile 3 to the OCM of the processing tile 61. The primitive code generator 220 may then perform a compilation with the linked memory spaces in order to map the IR to one or more components of the ML hardware. The compiled data 224 is a low-level instruction (e.g., binary)

created for the ML hardware. The compiled data 224 is transmitted to the ML hardware for execution.

It is appreciated that linked memory spaces (hereinafter called grouped memory space) may be only a portion of the memory space within each OCM. In other words, there is no need to link the entire OCMs together but rather only a portion thereof. It is further appreciated that the grouped memory spaces are synchronized such that operation on one (e.g., data access read, data write, data move, data remove, etc.) is synchronized with operation on another one. For example, moving content from the grouped memory space in an OCM of a processing tile 3 is synchronized with moving content from the grouped memory space within the OCM of processing tile 61 since the two grouped memory spaces are linked to one another. Moving of the content may be moving the data to an external memory component or moving the data to a different location internally within the same OCM. However, it is appreciated that data movement to a new location should have the same start and end address within the OCM of each of the processing tiles (i.e., processing tiles 3 and 61) in order to preserve the linkage between the grouped memory spaces, thereby enabling the same primitive function to be executed based on the same start and end address for different processing tiles. In other words, the addresses associated with the grouped memory spaces should be the same in each processing tile regardless of the operation because the same primitive, the same starting address, and the same ending address is being used for both processing tiles regardless of the data content being operated on by each processing tile.

In some embodiments, the compiler 200 may expose graph-level and operator-level optimizations to provide performance portability to ML application workloads across different accelerators and/or ML hardware. As one nonlimiting example, a compiler may support different accelerator architectures and/or ML hardware implementations and therefore may have to support different optimizations that may be applied at graph level as well as operator level in order to improve performance. For example, one accelerator may include a single but very large vector unit (which for optimization may map convolutions into vector operations with vector length utilizing ideally the full vector width) while another may include a large set of smaller vector units that process independently (which for optimization the convolution may be broken into smaller sub-problems that map to each of the small vector units within the large set of units). It is appreciated that the optimization may be on a graph level (e.g., depth first slicing) or on operator level. It is appreciated that in some embodiments, the compiler 200 is an ahead of time (AOT) compiler. Moreover, it is appreciated that the memory engine 230 utilizes the library/API module 240 that is different from a conventional library, to perform one or more of: determining allocation/deallocation of memory spaces for tensor data (e.g., intermediate tensor data), caching for better runtime performance, mapping computes to different processing elements of the ML hardware to reduce runtime latency, determining when to group (e.g., multiple single processing tile ML hardware single instruction multiple data (SIMD)) into one multi-cast SIMD task without introducing artificial serialization, and further enforcing serialization or allocation of additional tensor regions to avoid data hazards without slowing down the inference at runtime. It is appreciated that the memory engine 230 with the knowledge of ML hardware is leveraged as part of the compiler 200 to determine when to store tensor data (e.g., intermediate tensor data) to slower secondary components, e.g., DDR, to faster memory components, e.g., OCM, and register files on processing elements of the ML hardware before performing native compute operations.

Figure 2B:
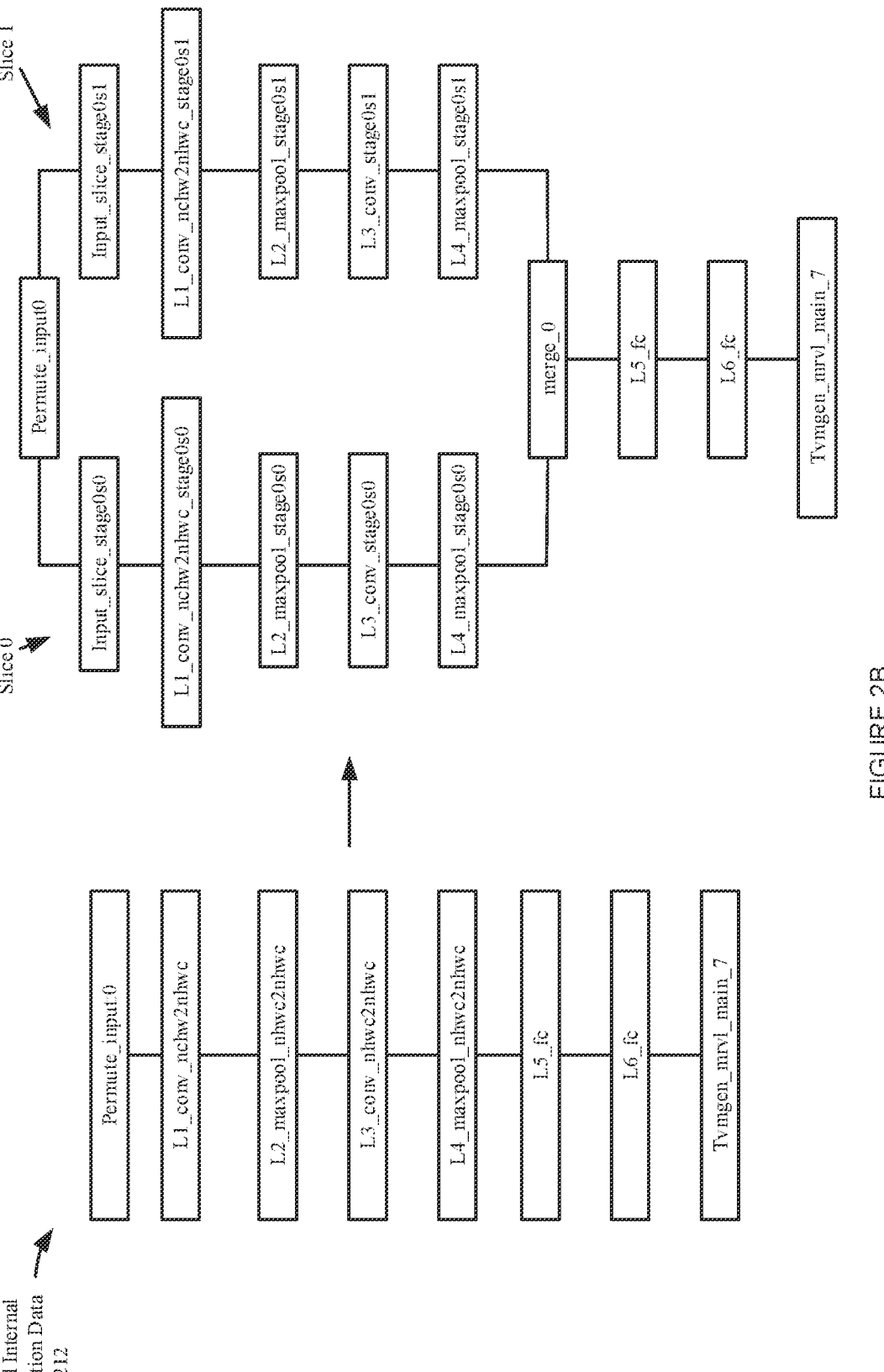
FIG. 2B depicts an example of internal representation data and transformation thereof according to one aspect of the present embodiments.

A nonlimiting example is described for illustrative purposes and should not be construed as limiting the scope of the embodiments. Referring now to FIG. 2B, an example of an IR data 202 and modified IR 212 according to one aspect of the present embodiments is shown. The code generator sequence 210 may receive the IR 202 and detect that total bytes of in-use tensor data for the L1_conv_nchw2nhwc layer is larger than the total bytes available in the OCM of the ML hardware. Accordingly, the code generator sequence 210 may determine that the split tensor algorithm should be instantiated to identify a slicing stage contained in layers L1 to L4 and to split input and output tensor data from L1 to L4 into two slices, e.g., slice 0 and slice 1. It is appreciated that the code generator sequence 210 may generate a transformed IR that now contains two branches (i.e., left branch and right branch) associated with each slice.

Figure 2C:
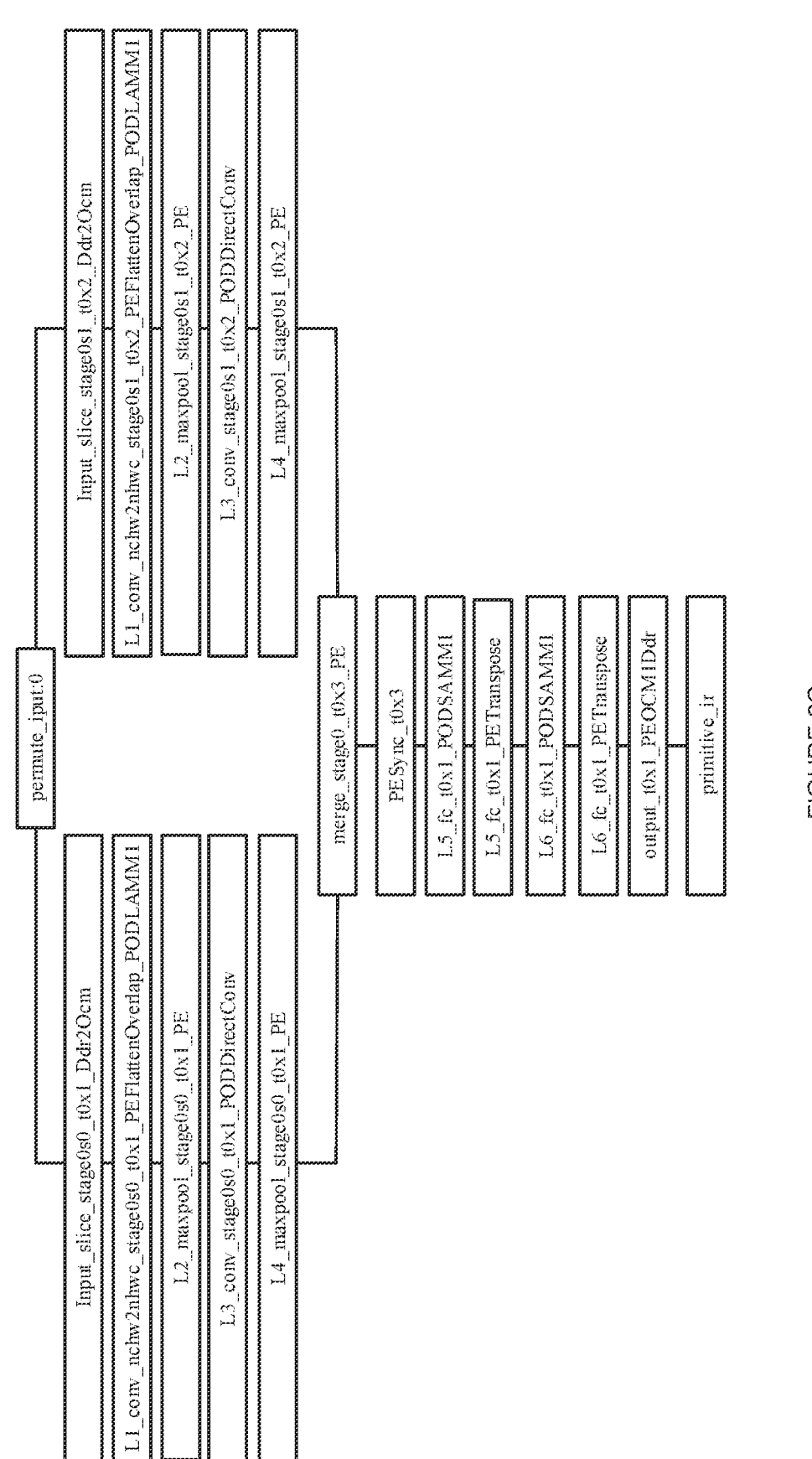
FIGS. 2C-2E depict examples of a primitive functions in a network mapped to respective processing tiles in the ML hardware according to one aspect of the present embodiments.

Referring now to FIG. 2C, the primitive code generator 220 may map the IR as shown in FIG. 2B to one or more components of the ML hardware. As illustrated, the left branch uses tile 0 (i.e., t0×1 that is a hexadecimal number and is associated with the lowest order bit) primitive IR nodes while the right branch uses tile 1 (i.e., t0×2 that is a hexadecimal number and that is associated with the next highest order bit) primitive IR nodes. The primitive generator 220 and/or the memory engine 230 may insert a merge_stage0_t0×3PE primitive node at the merge point such that multicast PE task (i.e., t0×3) can be dispatched and executed by processing element PE0 on tile 0 and processing element PE1 on tile 1, at runtime. It is appreciated that the merge task pushes the same address regions used to store two slices of L4's output tensor on OCM0 on tile 0 and OCM1 on tile 1 to form a combined memory region on OCM0 for saving the full output tensor of L4. In some embodiments, in order to avoid data hazard, e.g., race condition (as one nonlimiting example when a data block is overwritten before it is read and thus causing the wrong data to be read), the primitive code generator 220 may insert a PEsync primitive IR to synchronize the processing elements in order to enforce serialization during runtime in order to make sure that tile 0 cannot progress for L5 until the multicast merge task that was dispatched to both tiles 0 and 1 have been completed.

Figure 2D:
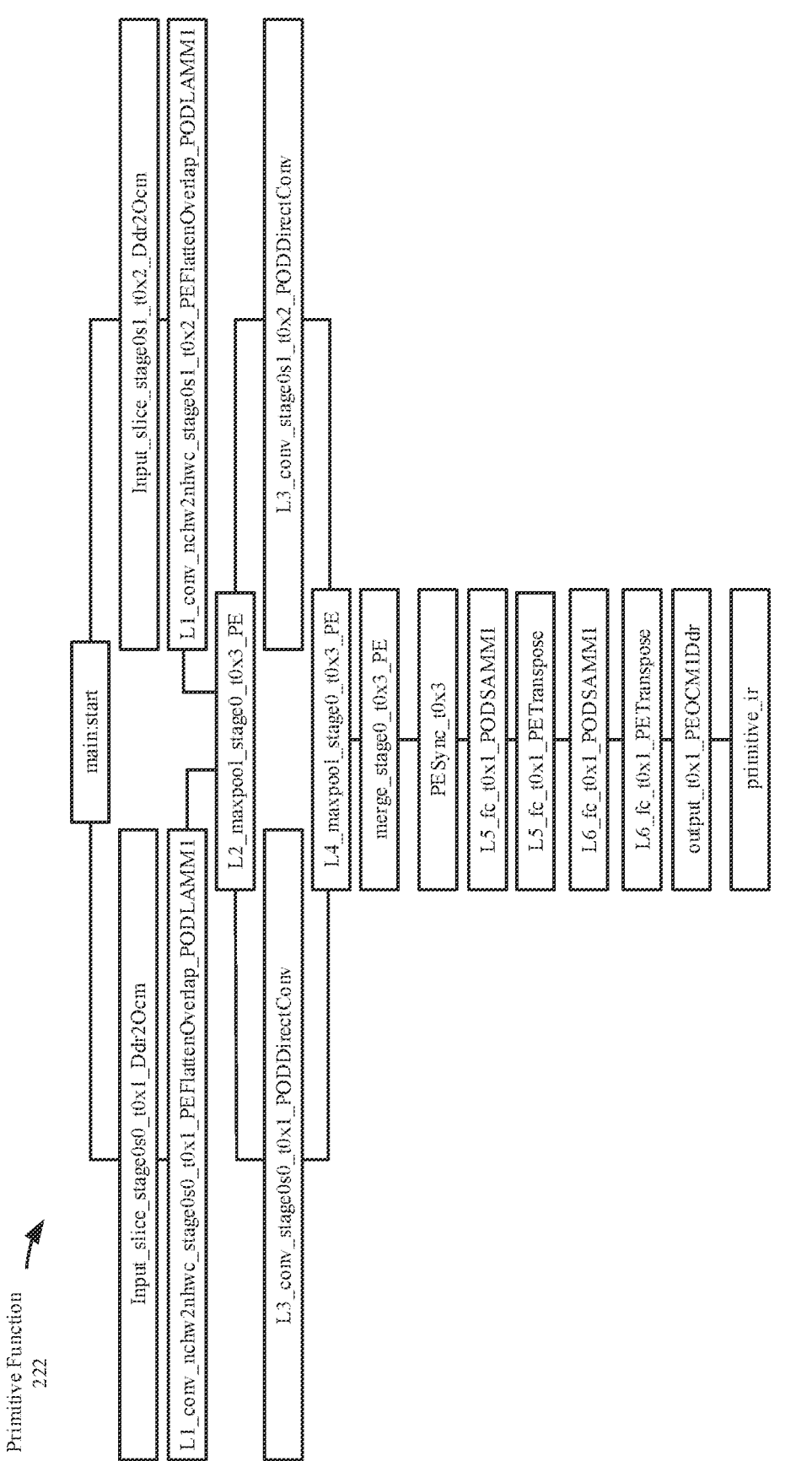

It is appreciated that more than one correct code generation sequence may be generated for the IR. For example, referring now to FIG. 2D, another example is provided for illustration purposes but should not be construed as limiting the scope of the embodiments. In this example, two pairs of IR nodes (from FIG. 2C), e.g., L2_maxpool_stage0s0_t01×1 PE node for PE0 on tile 0 and L2_maxpool_stage0s1_t01×2 PE node for PE1 on tile 1, and two L4 IR nodes L4_maxpool_stage0s0_t0×1_PE for PE0 on tile 0 and L4_maxpool_stage0s1_t0×2_PE for PE1 on tile 1, are identified and grouped into the multi-cast IR nodes L2_maxpool_stage0_t0×3_PE and L4_maxpool_stage0_t0× 3_PE respectively (as shown in FIG. 2D). It is appreciated that the IR nodes may be grouped together when input tensors for the primitive IR nodes on different processing tiles have the same dimension and the output tensors for the primitive IR nodes on different processing tiles have the same dimension and that different processing tiles perform the same primitive function (computation). In other words, two IR nodes for processing tiles 0 and 1 can be combined if their input tensors have the same dimension, if their output tensors have the same dimension, and if both processing tiles are performing the same primitive function.

It is appreciated that in order for the compiler 200 to generate a final ISA code, the compiler may trace the code generated sequence by calling each pre-defined primitive function accordingly (i.e., tracing the primitive function sequence). It is further appreciated that when executing a primitive function at compiler time, the compiler may pass the needed data and information to the function to generate the intended low-level instructions (i.e., binary code). The information may include but is not limited to names and dimensions of input and output tensor data, intended compute strategy, processing tile mapping and memory restrictions, location of input tensor, optional information of adjacent IR nodes, etc.

In some embodiments, the memory engine 230 is leveraged by having knowledge of the ML hardware architecture in order to perform specific memory management for various processing tiles, their respective OCM, etc. For example, the memory engine 230 may identify/determine processing tiles that are going to execute the same primitive function. The input/output tensors associated with the primitive function for the identified processing tiles are examined and if the input tensors have the same dimension as one another and if the output tensors have the same dimension as one another, then a memory space within an OCM of respective processing tiles may be linked together because they perform the same computation, and since the dimensions of the input/output tensors are the same, the same starting and ending address within each OCM may be used. Thus, the number of instructions that need to be transmitted to the processing tiles is reduced. For example, instead of sending two instructions, one for each tile to perform the primitive function, one instruction may be sent because the primitive function is the same for the processing tiles and the starting/ending address are the same (by virtue of the memory spaces being linked to one another). It is, however, appreciated that each processing tile may process a different data content because even though the data is stored in the same address (on different OCMs of different processing tiles) the actual data may be different from one another. Moreover, it is appreciated that in some examples the same instructions may trigger a processing tile specific operation, e.g., an instruction may take the processing tile ID into account when calculating an offset, or an instruction may perform a relative data movement between processing tiles such that a processing tile sends a data to its neighboring processing tiles (e.g., processing tiles to the left/right if the mapping is to a 1 dimensional grid). As such, the destination address used by each processing tile is different even though the same instruction has been provided to each processing tile.

Figure 2E:
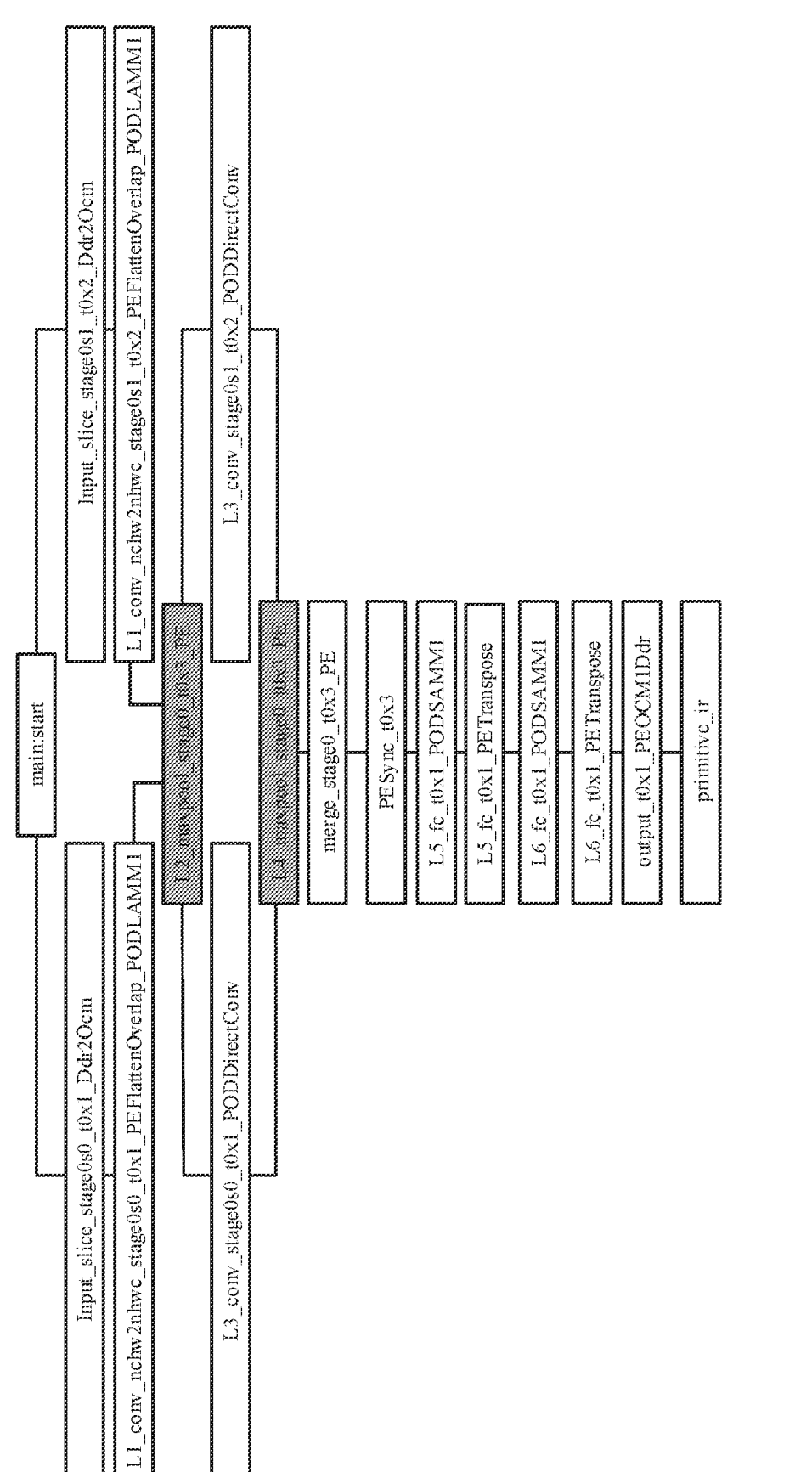

Referring to FIG. 2E, two IR nodes, as were described above, are identified as performing the same primitive function on two different processing tiles (e.g., processing tiles 0 and 1) and both with the same dimension for their input tensors as one another and both with the same dimension for their output tensors as one another. It is appreciated that throughout this application, the examples are provided with respect to two tiles satisfying the above condition for illustration purposes but the embodiments should not be construed as limited thereto. For example, the same process may be performed for three or more processing tiles satisfying the criteria above.

Figure 3A:
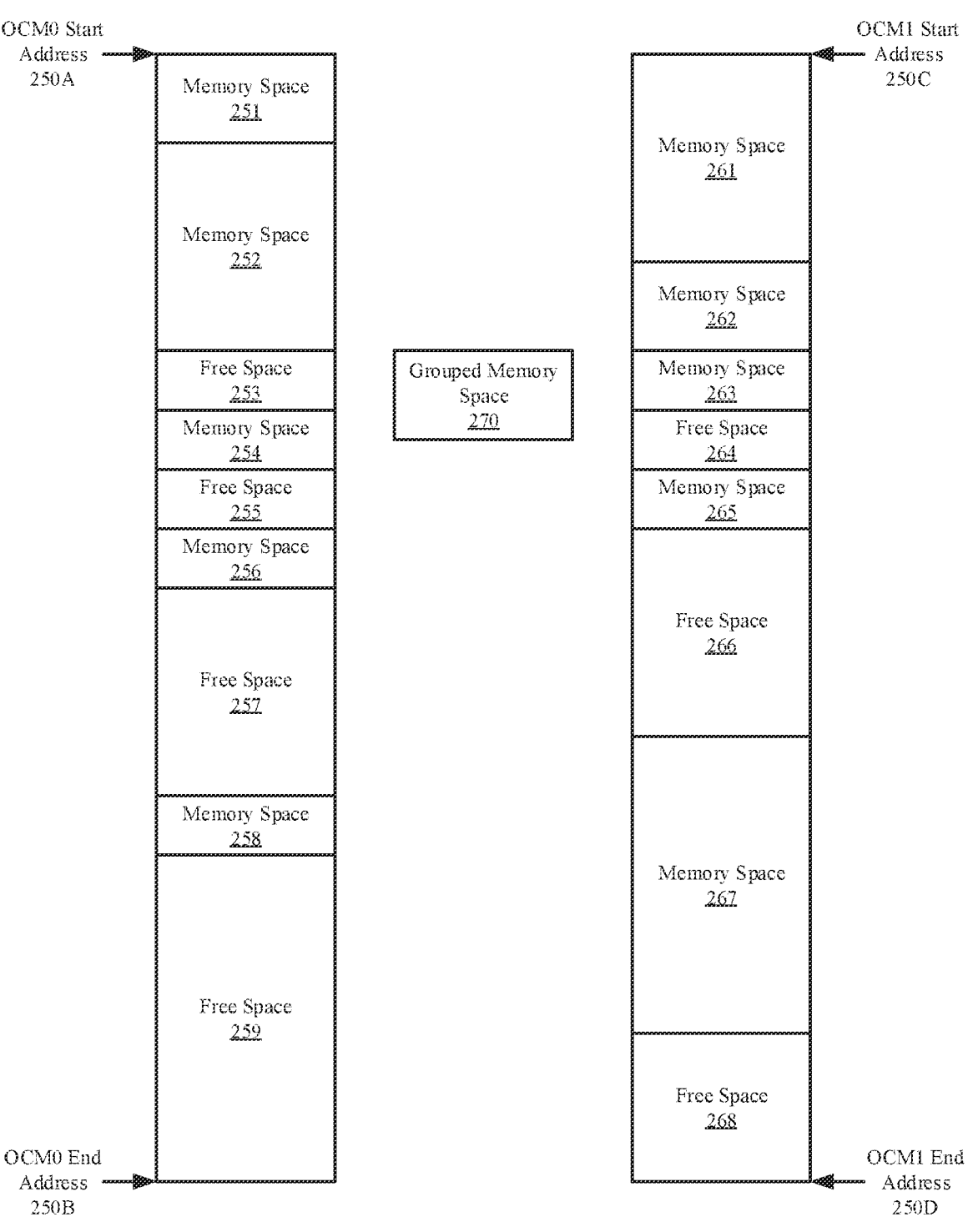
FIGS. 3A-3E depict examples of slicing linking memory space ranges from different processing tiles to one another according to one aspect of the present embodiments.

FIGS. 3A-3E depict examples of slicing linking memory space ranges from different processing tiles to one another according to one aspect of the present embodiments. Referring now to FIG. 3A, linking two memory space in two different OCMs of two different processing elements according to some embodiments is shown. It is appreciated that the primitive code generator indicates to the memory engine 230 that the memory space is linked across two or more processing tiles and that each have the same dimension for their respective input tensor and have the same dimension for their respective output tensor, as described above.

In this nonlimiting example, OCM 0 is the OCM of processing tile 0 and OCM 1 is the OCM of processing tile 1. The compiler has made a determined that the same primitive function is being performed by processing tiles 0 and 1, as described in FIGS. 2A-2E. OCM 0 may have a starting address 250A and an ending address 250B whereas OCM 1 may have a starting address 250C and an ending address 250D. OCM 0 may include memory space 251, 252, 254, 256, and 258 with free memory space 253, 255, 257, and 259. OCM 1 may include memory space 261, 262, 263, 265, and 267 with free memory space 264, 266, and 268. It is appreciated that free memory space are ranges of memory space that are free to be used as opposed to memory spaces that are being used. In this nonlimiting example, the compiler has made a determination that a range of memory address (i.e., grouped memory space 270) in OCM 0 and 1 should be linked together (i.e., grouped together). The grouped memory space 270 may be larger than free space 253 in OCM 0 and as such unsuitable for being linked and moreover the same memory address in OCM 1 is not free but is rather memory space 263 and is in use and as such cannot be a suitable grouped memory space in OCM 1.

Figure 3B:
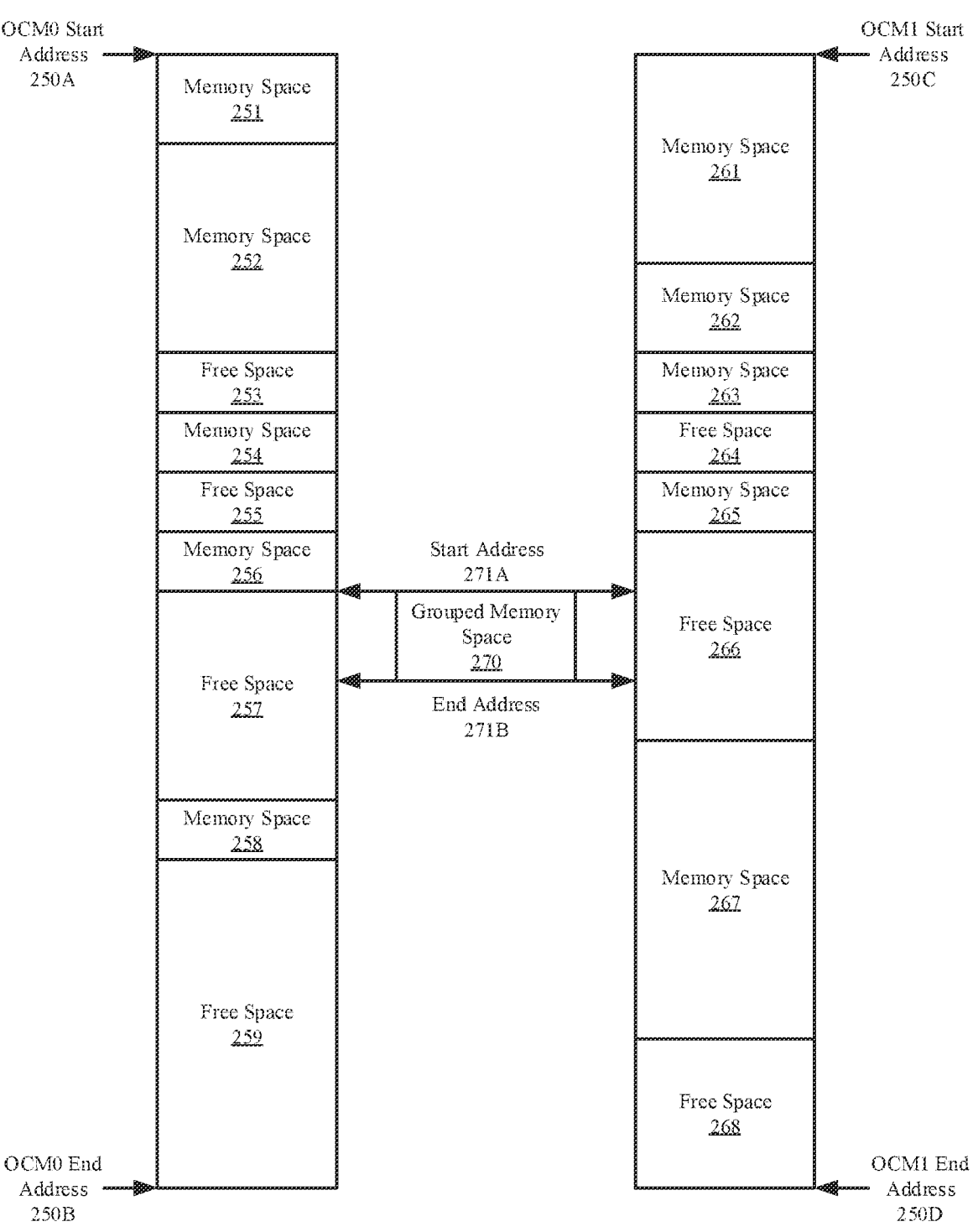

It is appreciated that this process may continue and the memory engine 230 may identify a region within OCM 0 and OCM 1 that can be linked together, as shown in FIG. 3B. In this nonlimiting example, the memory engine 230 identifies the starting address 271A and ending address 271B of the grouped memory space 270, which falls within the free space 257 in OCM 0 and free space 266 in OCM 1. As illustrated, the starting address 271A is the same for the grouped memory space even though it is in two different OCMs in two different processing tiles. Similarly, the ending address 271B is the same for the grouped memory space even though it is in two different OCMs in two different processing tiles. It is appreciated that the once linked together, grouped memory space 270 in OCM 0 and OCM 1 should be tracked such that when an operation is being performed on one then the same operation is being performed on the other one. For example, when data is being moved from the grouped memory space 270 of OCM 0 to a secondary memory, e.g., a DDR memory, then the data in the grouped memory space 270 of OCM 1 should also be moved to the DDR. Similarly, if the grouped memory space 270 in OCM 0 is being moved, e.g., shifted up/down, then the grouped memory space 270 in OCM 1 should also be moved similar to OCM 0. As yet another example, if the data in the grouped memory space 270 of OCM 0 is being deleted then the data in the grouped memory space 270 of OCM 1 should also be deleted. In other words, the grouped memory spaces in different processing tiles are synchronized together and should be treated in the same fashion as one another.

Figure 3C:
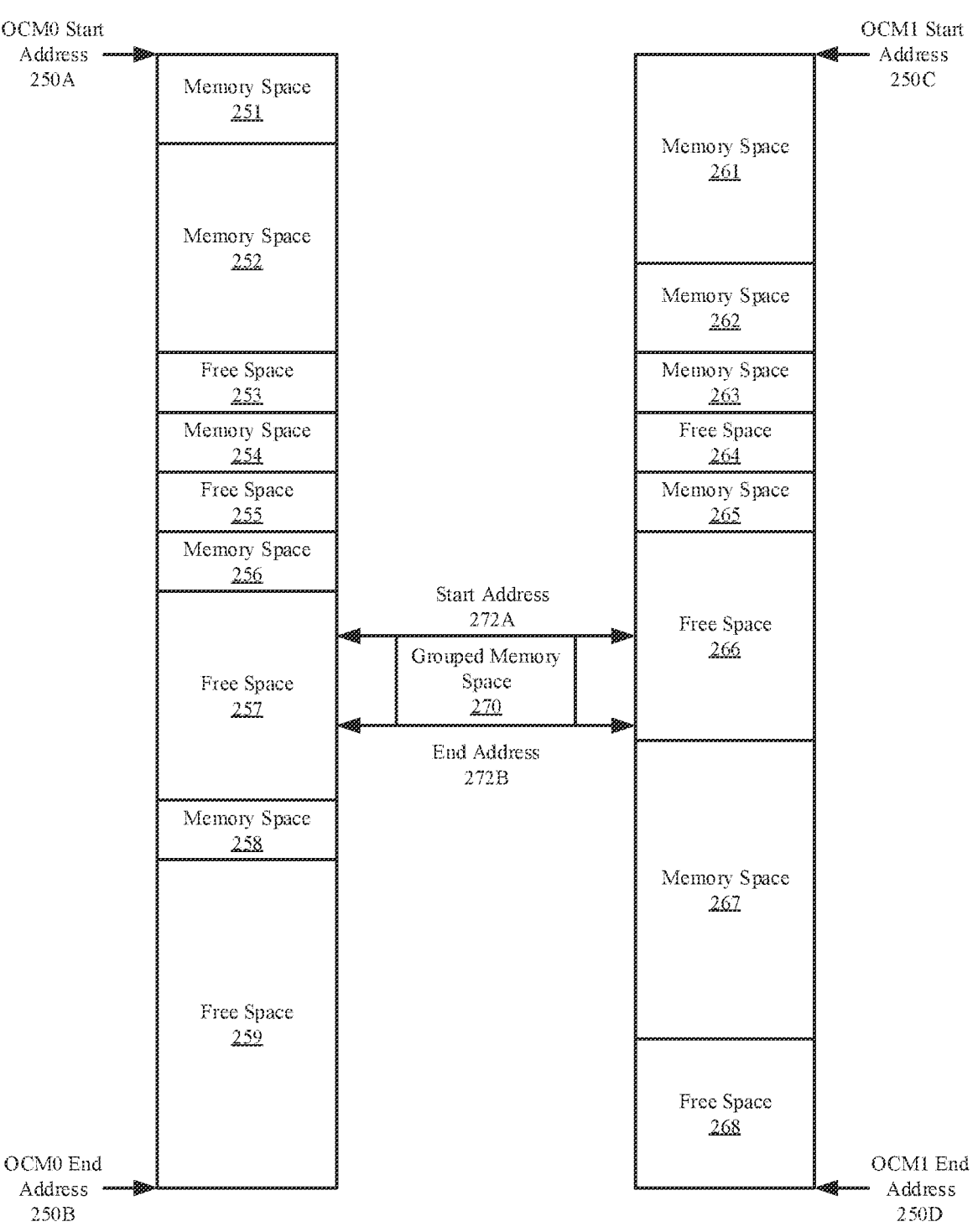
Figure 3D:
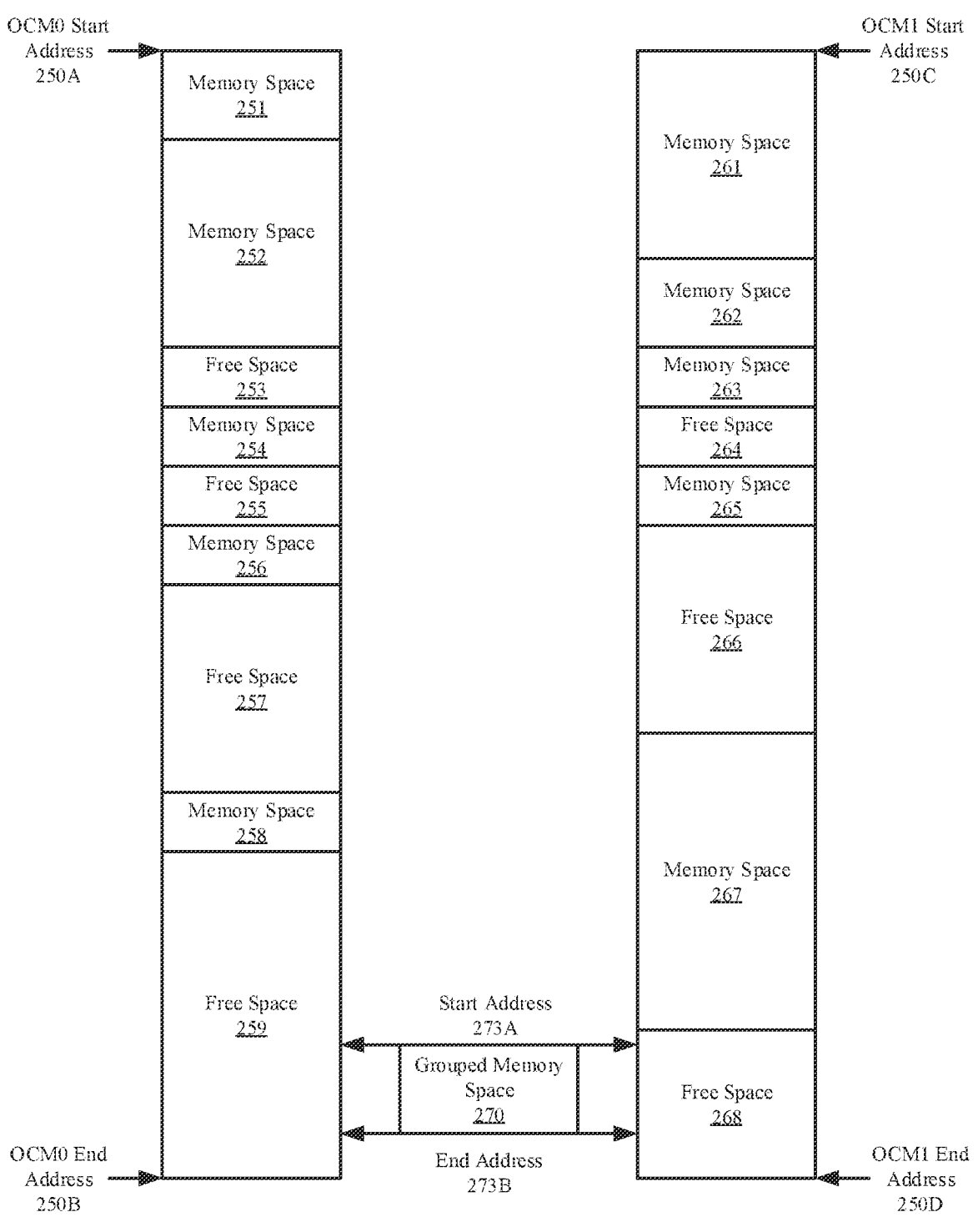
Figure 3E:
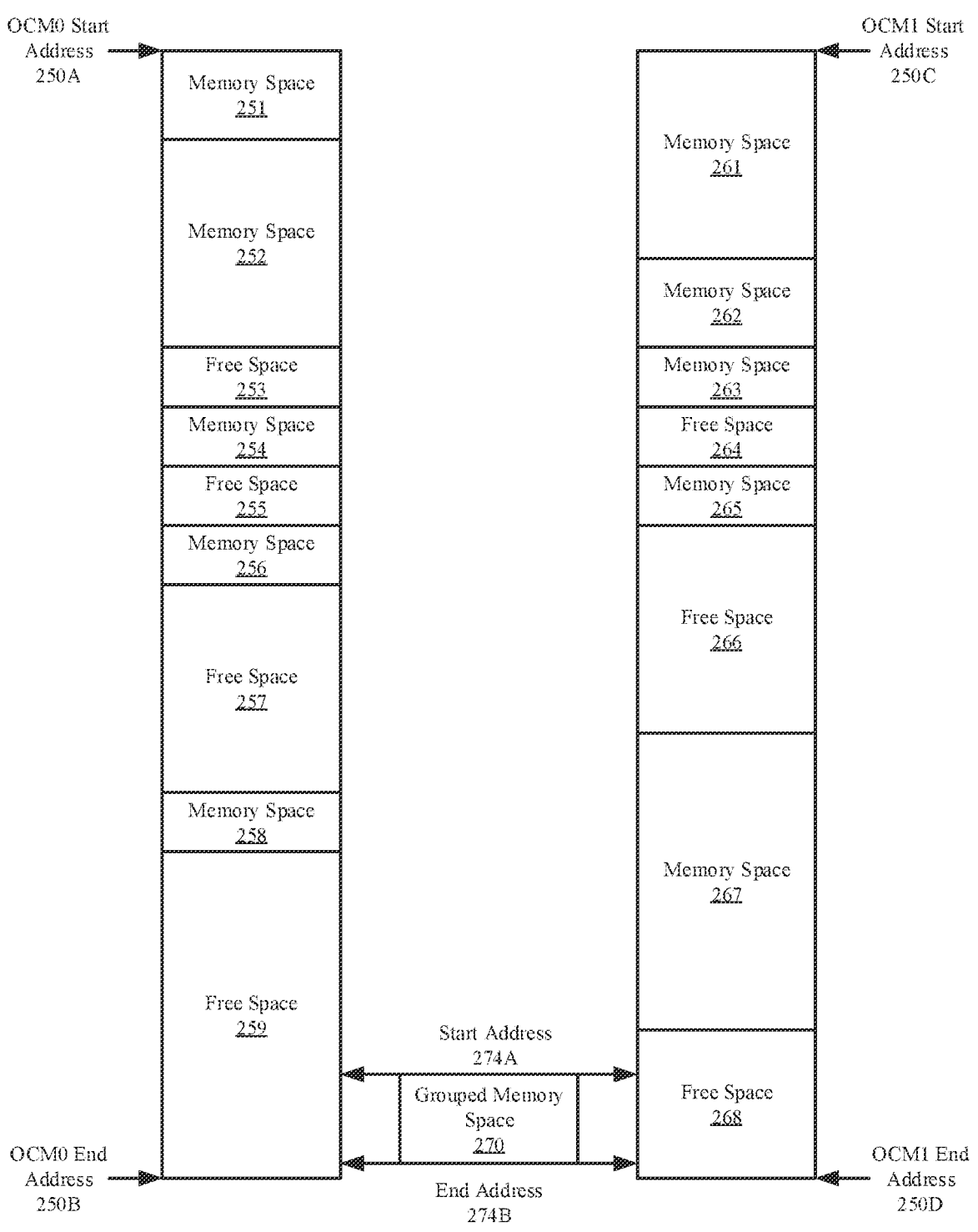

Referring now to FIG. 3C another alterative for the stating address 272A and the ending address 272B for the grouped memory space 270 in OCM 0 and OCM 1 is shown. As yet another example, the starting address 273A and the ending address 273B for the grouped memory space 270 in OCM 0 and OCM 1 may be determined by the memory engine 230, as illustrated in FIG. 3D. In this example, the grouped memory space 270 in OCM 0 falls within the free space 259 and the grouped memory space 270 in OCM 1 falls within the free space 268. Referring now to FIG. 3E another alterative for the stating address 274A and the ending address 274B for the grouped memory space 270 in OCM 0 and OCM 1 is shown. It is appreciated that once the grouped memory space in different OCMs are linked to one another, then the grouped OCM is no longer a free space but in use space (not shown here).

Figure 4:
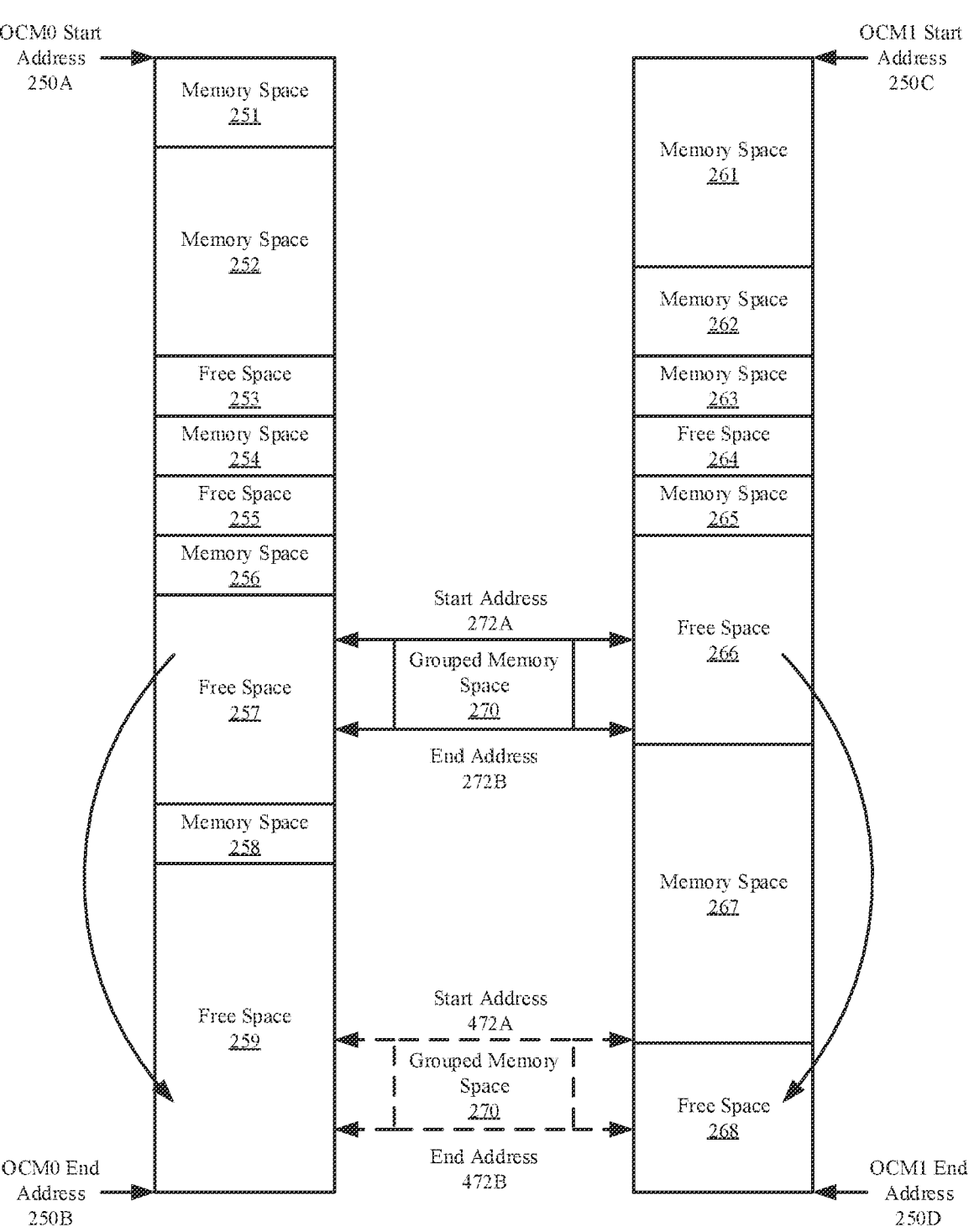
FIG. 4 depicts an example of moving the grouped memory space within each processing tile that are linked together according to one aspect of the present embodiments.

Referring now to FIG. 4, an example of moving the grouped memory space within each processing tile that are linked together according to one aspect of the present embodiments is depicted. FIG. 4 is a continuation of FIG. 3C where the grouped memory space 270 has a starting address 272A and ending address 272B within the free space 257 of OCM 0 and free space 266 of OCM 1. In this nonlimiting example, if one grouped memory space is moved or shifted, e.g., grouped memory space in OCM 0 is moved, then the other grouped memory space, i.e., grouped memory space 270 of OCM 1, should also be moved such that the new location has the same starting and ending addresses. For example, the new starting address 272A and the new ending address 272B for the grouped memory within the free space 259 in OCM 0 and free space 268 in OCM 1 are shown as dash lines. In other words, the grouped memory space from different OCMs in different processing tiles are treated the same as one another.

Figure 5A:
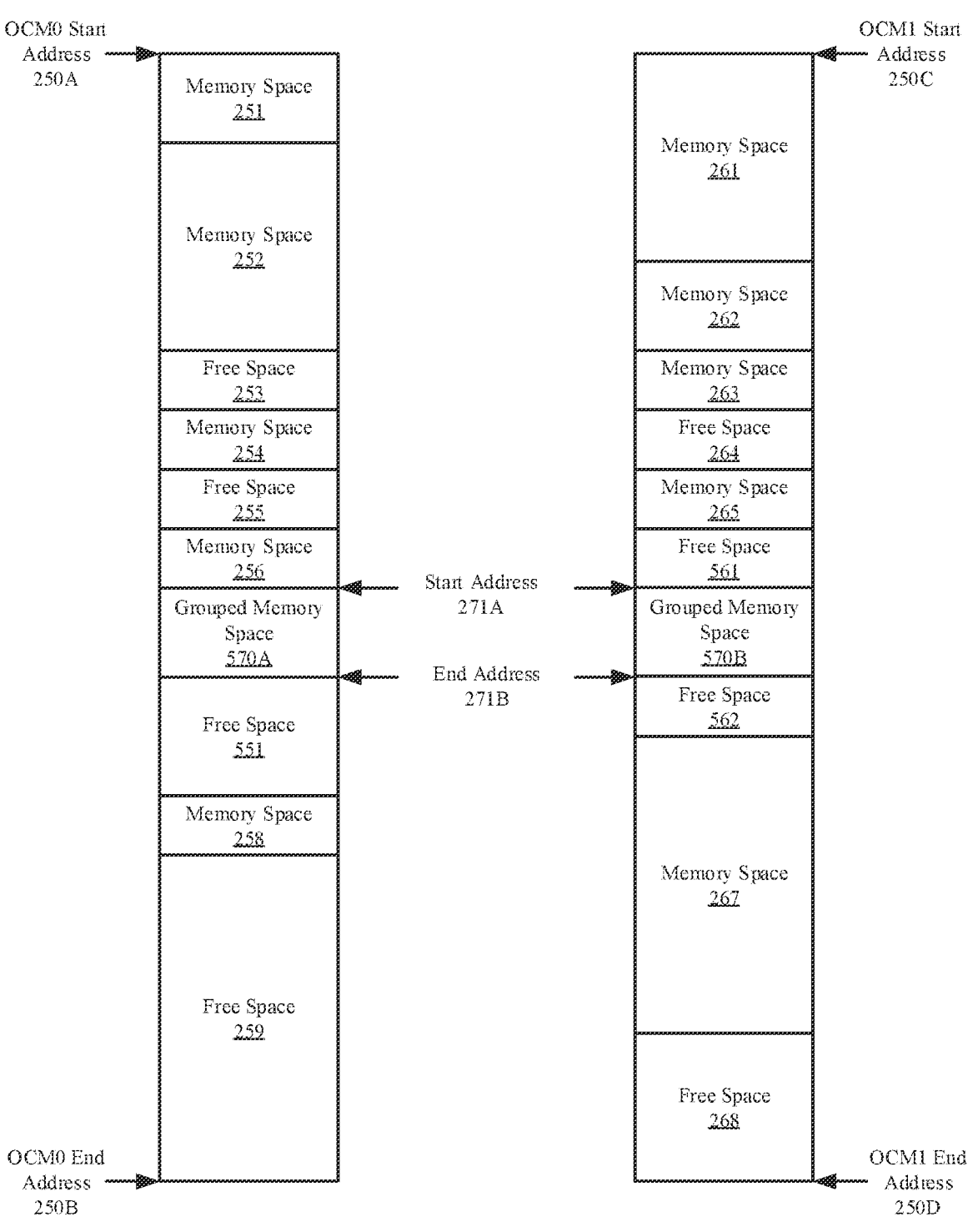
FIGS. 5A-5B depict an example of removing/deleting content from the grouped memory spaces in different processing tiles that are linked to one another according to one aspect of the present embodiments.
Figure 5B:
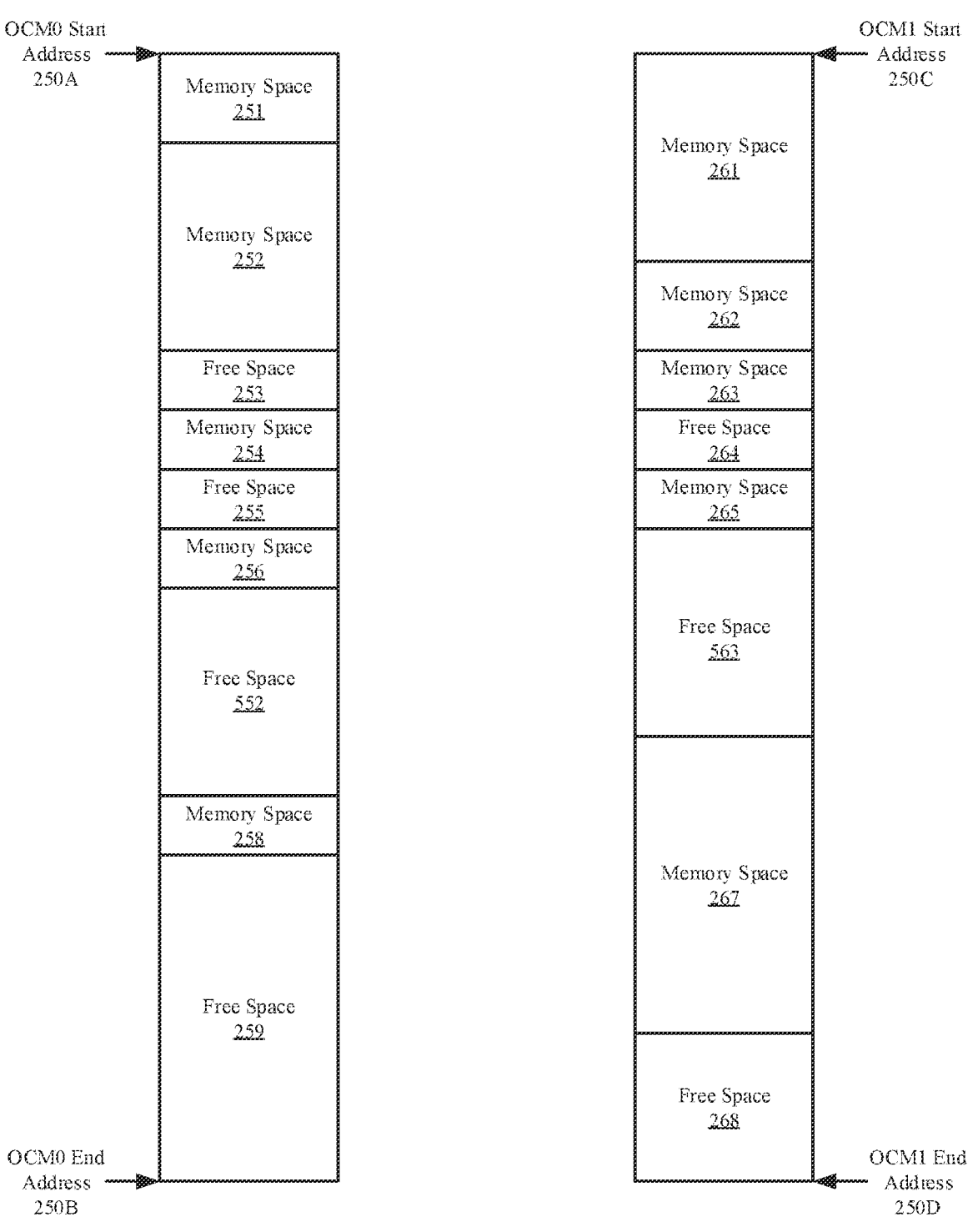

FIGS. 5A-5B depict an example of removing/deleting content from the grouped memory spaces in different processing tiles that are linked to one another according to one aspect of the present embodiments. FIG. 5A is a continuation of FIG. 3B where the grouped memory space 570A in OCM 0 and grouped memory space 570B in OCM 1 have been linked together and have the same starting address 271A and the same ending address 271B. It is appreciated that the grouped memory space 570A in OCM 0 of processing tile 0 reduces the available free space 257, as shown in FIG. 3B, to free space 551, as shown in FIG. 5A. Similarly, the grouped memory space 570B in OCM 1 of processing tile 1 reduces the available free space 266, as shown in FIG. 3B, to free space 561 and 561. In other words, because of the location of the grouped memory space 570B, two smaller free space regions 561 and 562 above and below the grouped memory space 570B is created. In some embodiments, having a larger continuous memory space is more advantageous and there are methods by which to accomplish that are described below.

Referring now to FIG. 5B, the link between the two grouped memory spaces 570A and 570B is removed and the previously occupied memory space is released. As such, free space 552 in OCM 0 and free space 563 in OCM 1 is created. It is appreciated that the free space 552 may be the same as the original free space 257 of OCM 0, as described in FIG. 3B. Similarly, it is appreciated that the free space 563 may be the same as the original free space 266 of OCM 1, as described in FIG. 3B.

It is appreciated that the memory engine 230 may, in addition to linking memory spaces together as described in FIG. 2A-5B, perform other functions. For a nonlimiting example, the memory engine 230 may perform memory management by inserting a memory space in a memory block, inserting a memory space in a memory block at a particular starting address, inserting a memory space in a memory block at the end of a particular ending address, deleting space from a memory block, searching the memory by returning start and end address of a memory space, updating memory address with given start and end address, checking if the space of given size is available in a memory block, getting all free spaces available in a memory block, returning next block to move content to a secondary memory, printing memory status at a current state of execution, returning the name of the memory block, etc. In other words, the memory engine 230 may utilize one or more capabilities, as listed above, to gain insight into the memory blocks within an ML hardware, e.g., identifying free space, etc. It is appreciated that the memory engine 230 may also perform memory management on a per processing tile basis by for example, inserting space in an OCM given a processing tile ID, inserting space in an OCM given a particular processing tile mask, deleting space in an OCM given the processing tile ID, inserting space in a secondary memory, deleting space in the secondary memory, searching for space in an OCM of a given processing tile, inserting linked space in multiple processing tiles given the processing tile mask, deleting linked spaces in multiple processing tiles given the name of the memory space, searching for linked space given the name returning the start and the end address, printing secondary memory spaces linkage to the original OCMs, printing complete status of memory at the current state of execution, printing OCM state given the processing tile ID at a current state of execution, etc. It is appreciated that some of the features listed above are described with respect to FIG. 6A through FIG. 14, as described below.

In some nonlimiting example, three grouped memory spaces of three different OCMs, e.g., OCM 0, OCM 1, and OCM 2, associated with processing tiles 0, 1, and 2 respectively may be linked together. As such, the memory engine 230 may print the status of each OCM as shown below that includes OCM 3 that has no grouped memory space as well as an external memory, e.g., a DDR.

| Space | begin_addr | end_addr | size |
|---|---|---|---|
| Printing status of OCM_0 | | | |
| IO | 0 | 1fff | 2000 |
| test0 | 2000 | 20ff | 100 |
| free_14 | 2100 | 31fe | 10ff |
| test7_0 | 31ff | fd3fe | fa200 |
| test8_0 | fd3ff | fd4fe | 100 |
| free_15 | fd4ff | fd4ff | 1 |
| test_12 | fd500 | fd5ff | 100 |
| test_13 | fd600 | fd6ff | 100 |
| free_17 | fd700 | ffff | 2900 |
| Printing status of OCM_1 | | | |
| test0 | 0 | ff | 100 |
| test12_1 | 100 | 14f | 50 |
| test10_1 | 150 | 1014d | fffe |
| free_7 | 1014e | fd4ff | ed3b2 |
| test_12 | fd500 | fd5ff | 100 |
| test_13 | fd600 | fd6ff | 100 |
| free_9 | fd700 | ffff | 2900 |
| Printing status of OCM_2 | | | |
| IO | 0 | 1fff | 2000 |
| free_3 | 2000 | fd4ff | fb500 |
| test_12 | fd500 | fd5ff | 100 |
| free_4 | fd600 | fdfff | a00 |
| WB | fe000 | ffff | 2000 |
| Printing status of OCM_3 | | | |
| IO | 0 | 1fff | 2000 |
| free_2 | 2000 | fdfff | fc000 |
| WB | fe000 | ffff | 2000 |
| Printing status of DDR | | | |
| test4_0 | 0 | fffe | ffff |
| free_1 | ffff | fffff | ff0001 |
| Printing Linkages in Mem Hierarchy | | | |
| Block | Linkages | | |
| test_12 | ----> OCM_0, OCM_1, OCM_2 | | |
| test_13 | ----> OCM_0, OCM_1 | | |
| Printing Secondary Mem status in Mem Hierarchy | | | |
| test4_0 | -----> OCM_0 | | |

As illustrated above, memory space names "test_12" in OCM 0, OCM 1 and OCM 2 are linked to one another. As such, their starting address is fd500 and their ending address is fd5ff and their size is 100. Moreover, "test_13" in OCM 0 and OCM 1 are linked to one another having a starting address fd600 and ending address of fdoff with a size of 100 each. Moreover, in this nonlimiting example, the memory space names "test4_0" is dumped to DDR from OCM 0, therefore has the secondary memory linkage to OCM 0. It is appreciated that printing the status of the OCM may also provide insight into memory usage of each respective OCM. As such, the memory engine 230 may determine the appropriate operations for memory management, e.g., freeing up memory space, moving content, shifting memory spaces, etc.

Figures 6A, 6B, 6C, 6D:
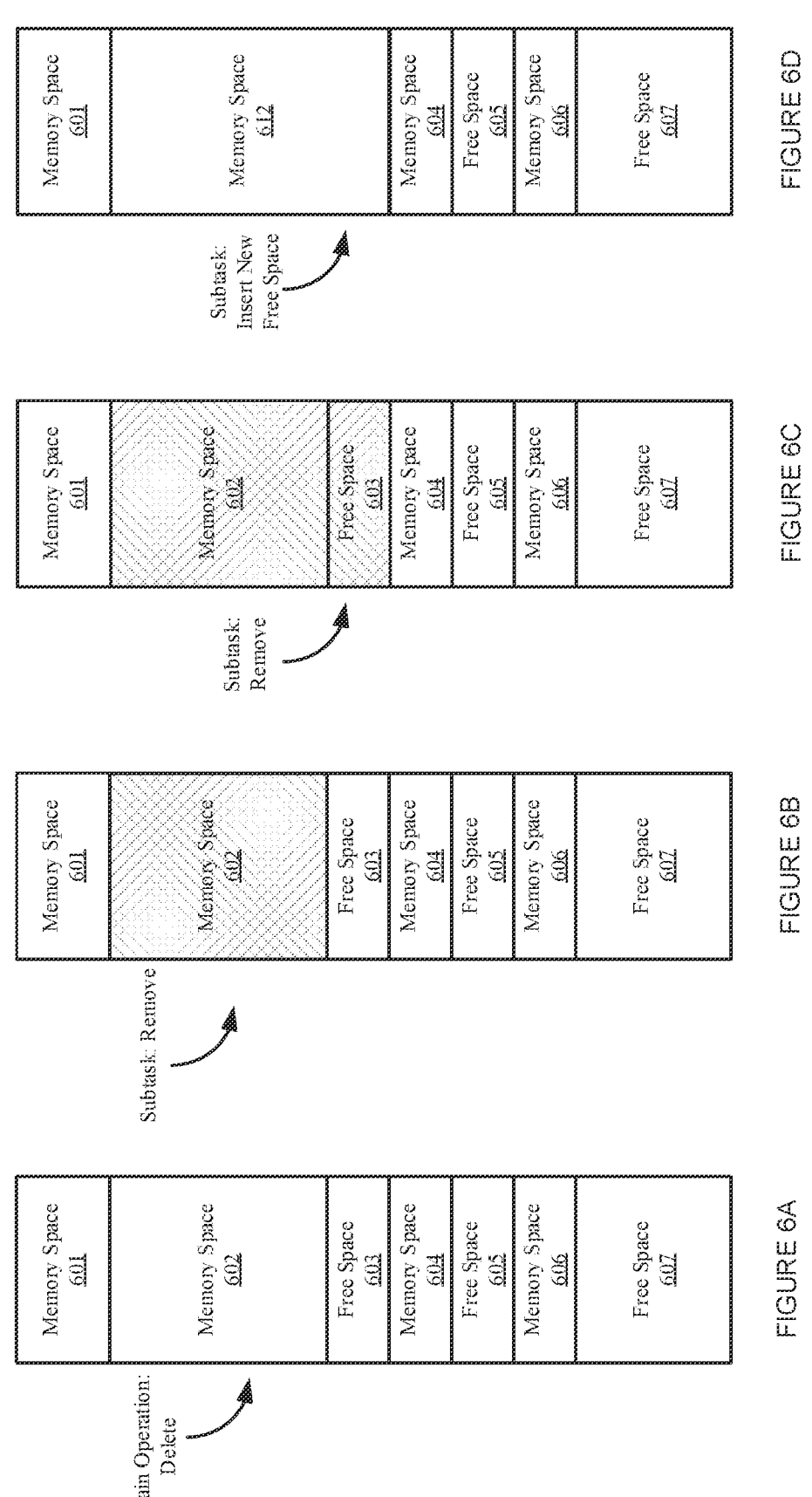
FIGS. 6A-6D depict an example of freeing up memory space according to one aspect of the present embodiments.

Referring now to FIGS. 6A-6D, an example of freeing up memory space according to one aspect of the present embodiments is depicted. It is appreciated that an OCM of a processing tile may include a memory space 601, 602, 604, and 606 and it may include free space 603, 605, and 607. It is appreciated that after the compiler determines that a grouped memory space in two different OCMs of two different processing tiles should be linked together, as described in FIGS. 2A-3F, it may determine that a given OCM as shown in FIG. 6A may not have enough continuous free space to accommodate the grouped memory space as required by the linking. As such, the memory engine 230 may cause the library 240 to insert ISA instructions to free up space in the OCM, as illustrated in FIGS. 6A-6D, to accommodate the grouped memory space and the linking of the instant OCM to another OCM of another processing tile. In this example, the main operation may be a deletion operation for memory space 602. Referring now to FIG. 6B, the content of memory space 602 is removed, per the subtask. Referring now to FIG. 6C, the content from free space 603 is also remove, per the subtask. It is appreciated that while a memory range may be free (i.e., free to use) it may not necessarily mean that it stores no data. As such, in this nonlimiting example, the content of the free space 603 (that is free to use) is also removed. Referring now to FIG. 6D, the subtask insert new free space is executed for the memory space 602 and free space 603 the content of which are now removed. As such, a new memory space 612 is inserted and labeled as free space. It is appreciated that this larger space may be used for grouped memory space and for linking with another OCM of another processing tile, as described above.

Figures 7A, 7B, 7C:
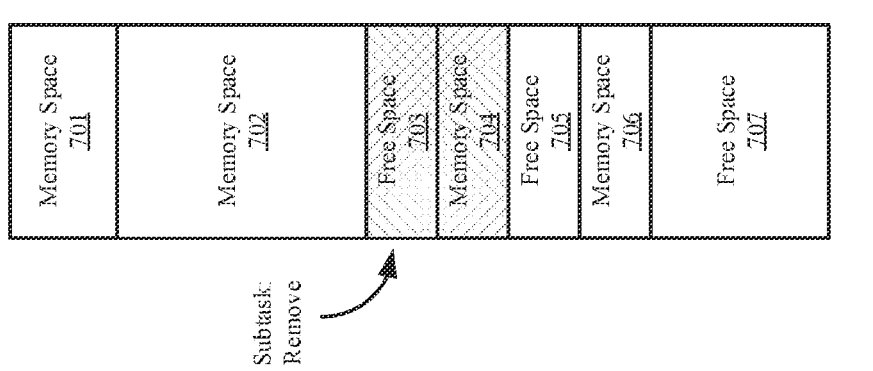
FIGS. 7A-7E depict an example of freeing up memory space according to another aspect of the present embodiments.
Figures 7D, 7E:
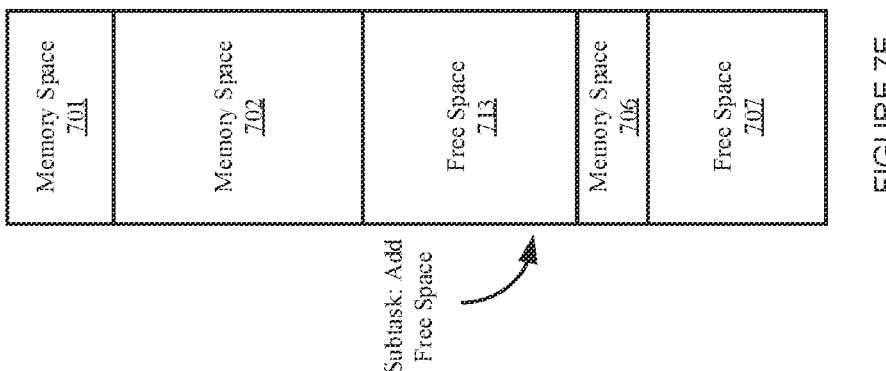

Referring now to FIGS. 7A-7E, an example of freeing up memory space according to another aspect of the present embodiments is depicted. It is appreciated that an OCM of a processing tile may include a memory space 701, 702, 704, and 706 and it may include free space 703, 705, and 707. It is appreciated that after the compiler determines that a grouped memory space in two different OCMs of two different processing tiles should be linked together, as described in FIGS. 2A-3E, it may determine that a given OCM as shown in FIG. 7A may not have enough continuous free space to accommodate the grouped memory space as required by the linking. As such, the memory engine 230 may cause the library 240 to insert ISA instructions to free up space in the OCM, as illustrated in FIGS. 7A-7E, to accommodate the grouped memory space and the linking of the instant OCM to another OCM of another processing tile. In this example, the main operation may be a deletion operation for memory space 704 (i.e., clearing record of the tensor data from the memory management system, thereby enabling the memory space to be overwritten). Referring now to FIG. 7B, the content of memory space 704 is removed (i.e., clearing record of the tensor data from the memory management system, thereby enabling the memory space to be overwritten), per the subtask. Referring now to FIG. 7C, the content from free space 703 is also removed (i.e., clearing record of the tensor data from the memory management system, thereby enabling the memory space to be overwritten), per the subtask. It is appreciated that while a memory range may be free (i.e., free to use) it may not necessarily mean that it stores no data. As such, in this nonlimiting example, the content of the free space 703 (that is free to use) is also removed (i.e., clearing record of the tensor data from the memory management system, thereby enabling the memory space to be overwritten). Referring now to FIG. 7D, the content from free space 705 is also remove, per the subtask. It is appreciated that while a memory range may be free (i.e., free to use) it may not necessarily mean that it stores no data. As such, in this nonlimiting example, the content of the free space 705 (that is free to use) is also removed. Referring now to FIG. 7E, the subtask insert new free space is executed for the memory space 702 and free spaces 703 and 705 the content of which are now removed. As such, a new memory space 713 is inserted and labeled as free space. It is appreciated that this larger space may be used for grouped memory space and for linking with another OCM of another processing tile, as described above.

Figure 8A:
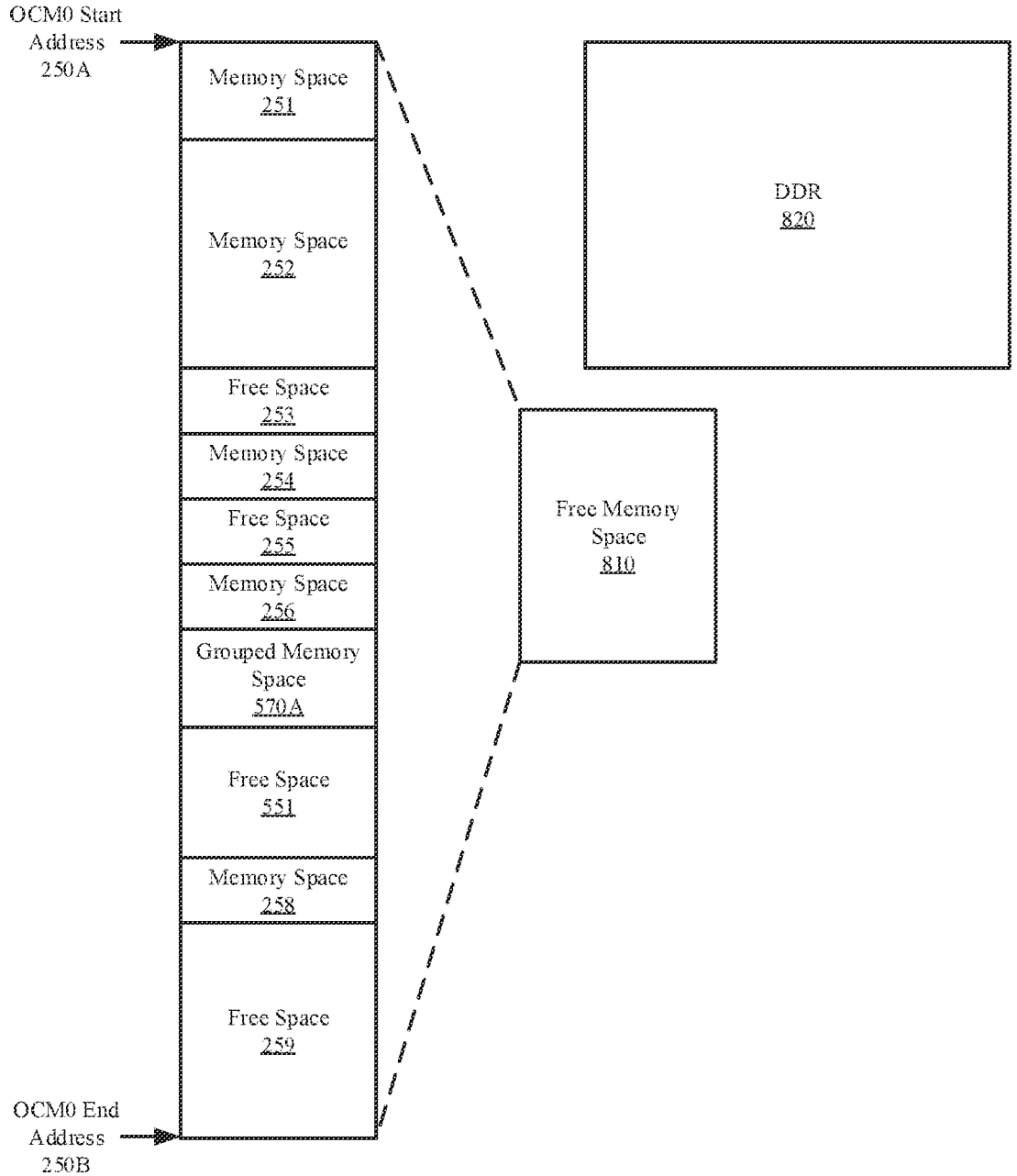
FIGS. 8A-8E depict freeing up memory space in an ML hardware by moving data to a secondary memory component according to one aspect of the present embodiments.
Figure 8B:
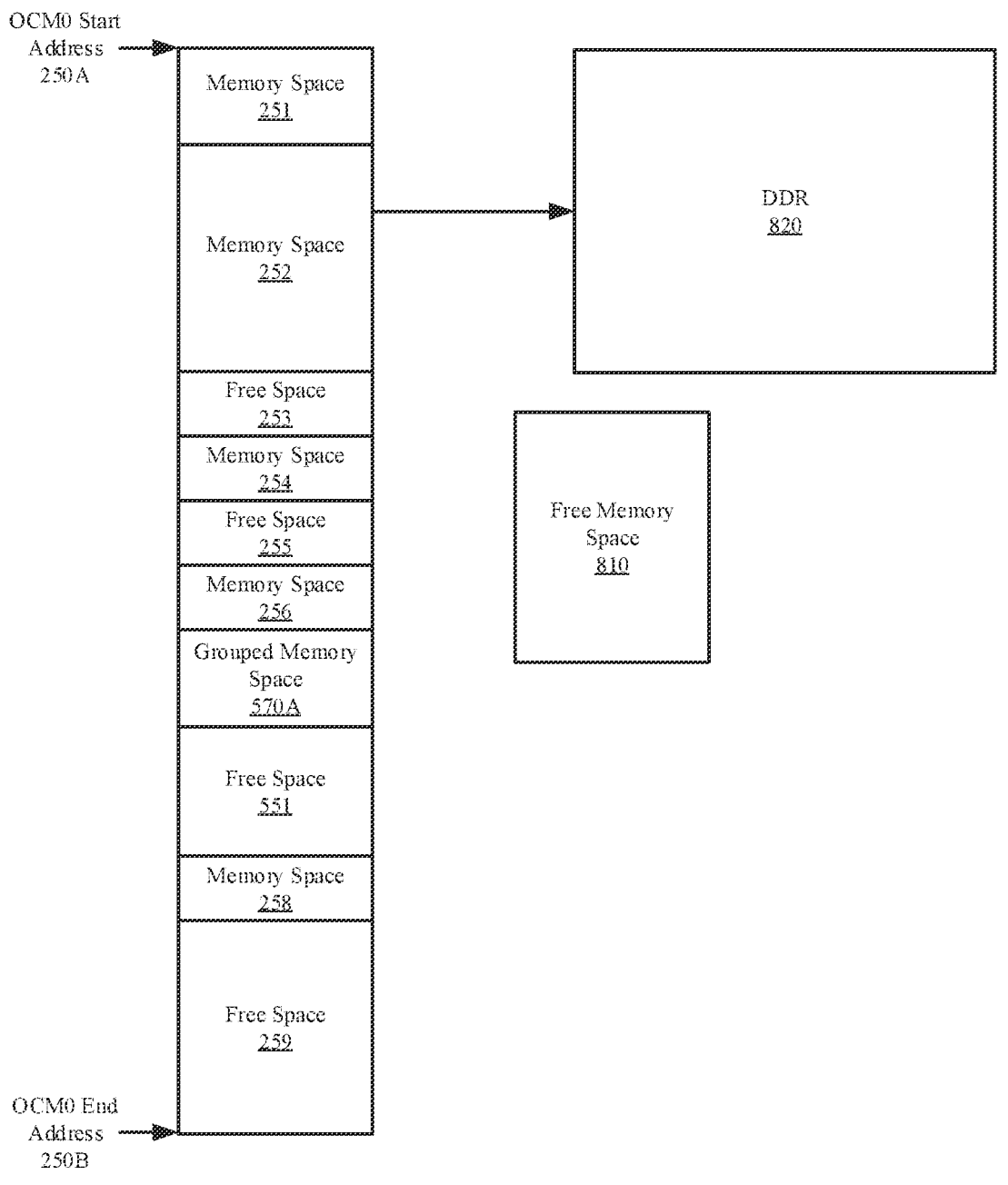

Referring now to FIGS. 8A-8E, freeing up memory space in an ML hardware by moving data to a secondary memory component according to one aspect of the present embodiments is depicted. FIG. 8A is a continuation of FIG. 5A after the grouped memory space 570A is linked to another grouped memory space within another OCM of another processing tile. In this example, the compiler, e.g., memory engine 230, may determine that additional memory space is needed, e.g., free memory space 810, in order to accommodate additional grouped memory space and linking with other OCMs or for a different reason. In this example, memory may be freed up in the OCM by moving data from the OCM to a secondary memory component, e.g., DDR 820, that is external to the ML hardware. It is appreciated that moving of non-grouped memory space to the external memory component is prioritized over grouped memory space. For example, in this illustration the grouped memory space 570A is moved to the DDR 820 as a last resort. In this example, the memory engine 230 determines that data from memory space 252 should be moved to the DDR 820. As such, the memory engine 230 may cause the library 240 to insert an ISA into the primitive functions generated by the primitive code generator 220 to move the data from the memory space 252 of that OCM to the DDR 820.

Figure 8C:
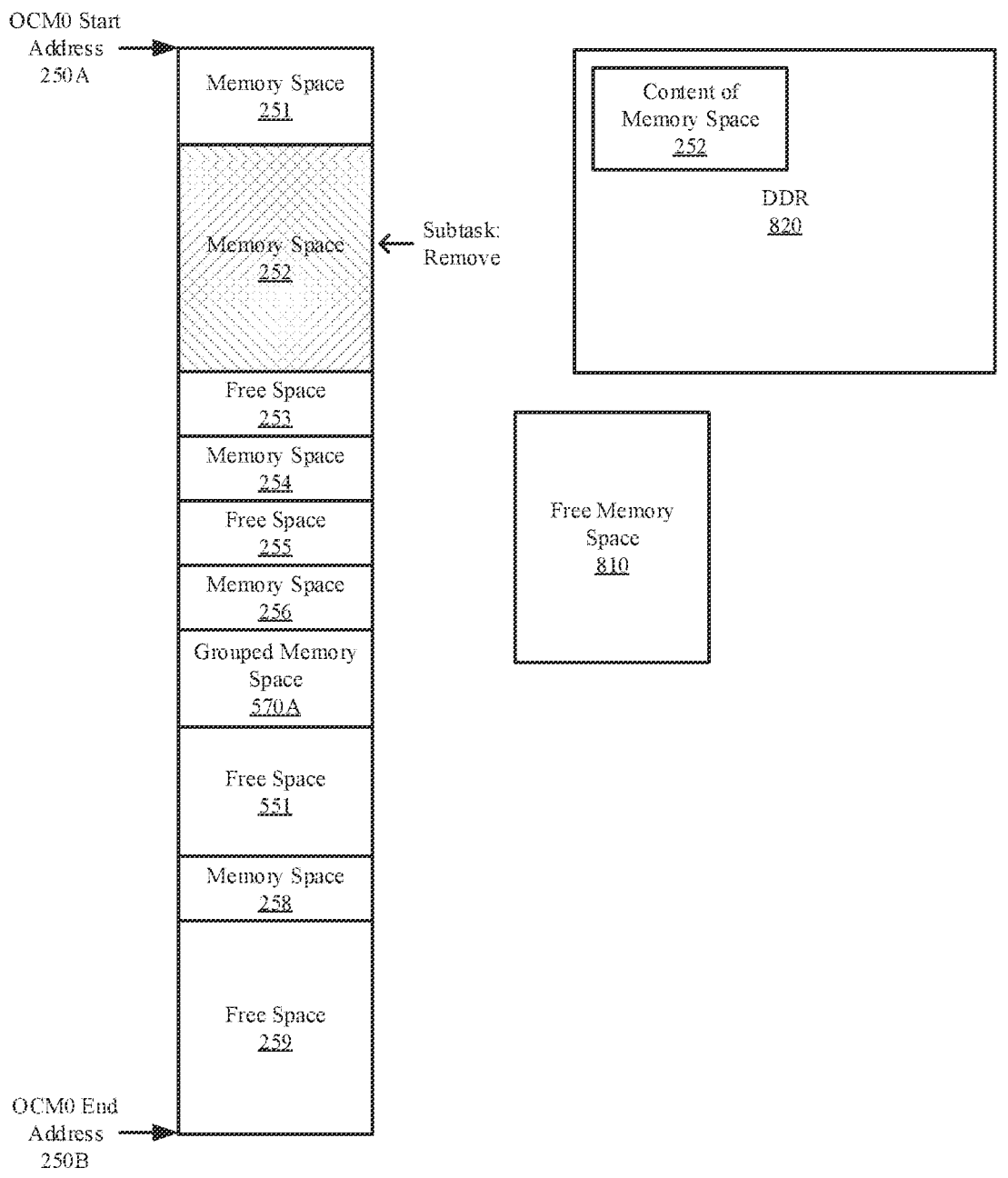
Figure 8D:
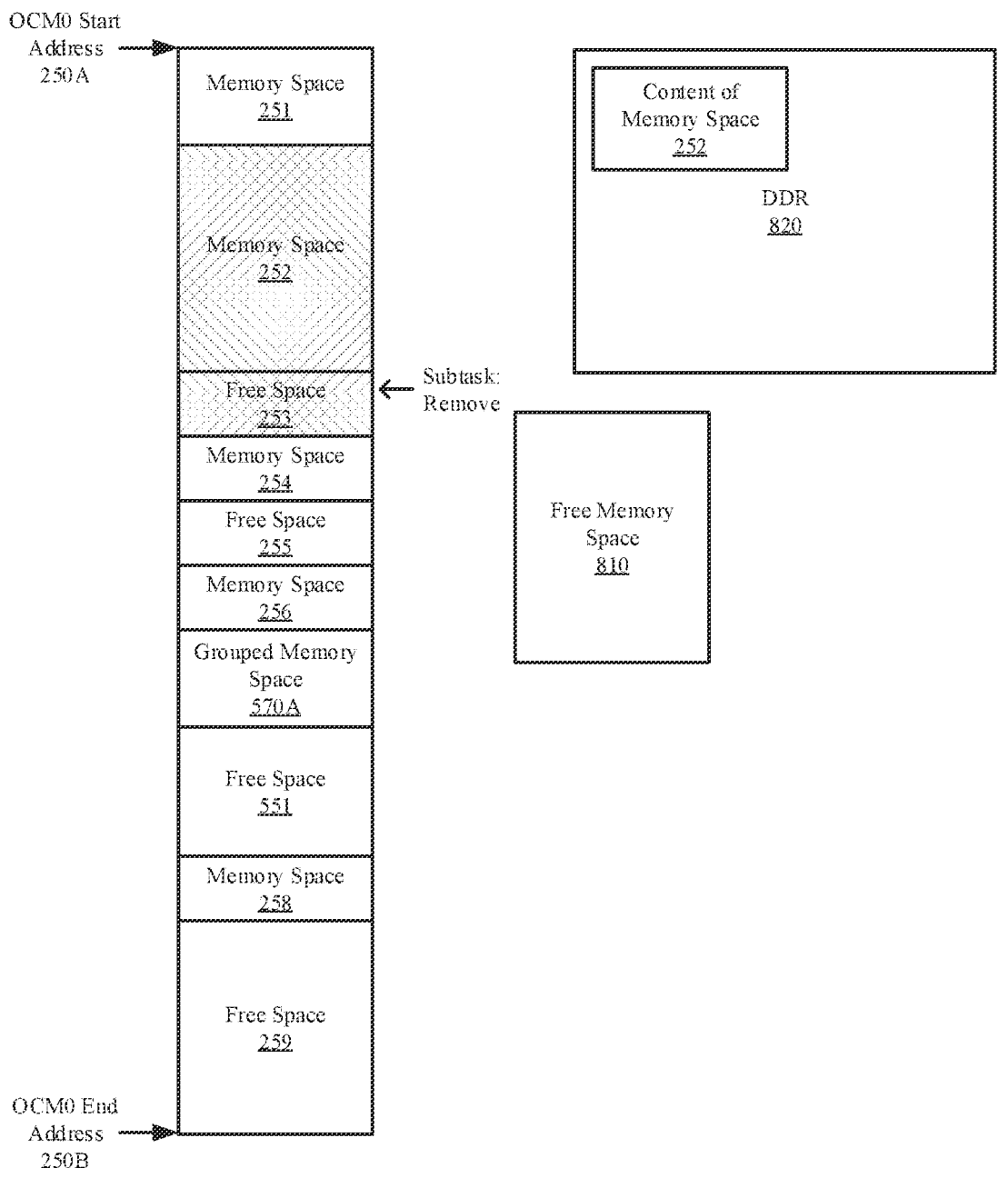
Figure 8E:
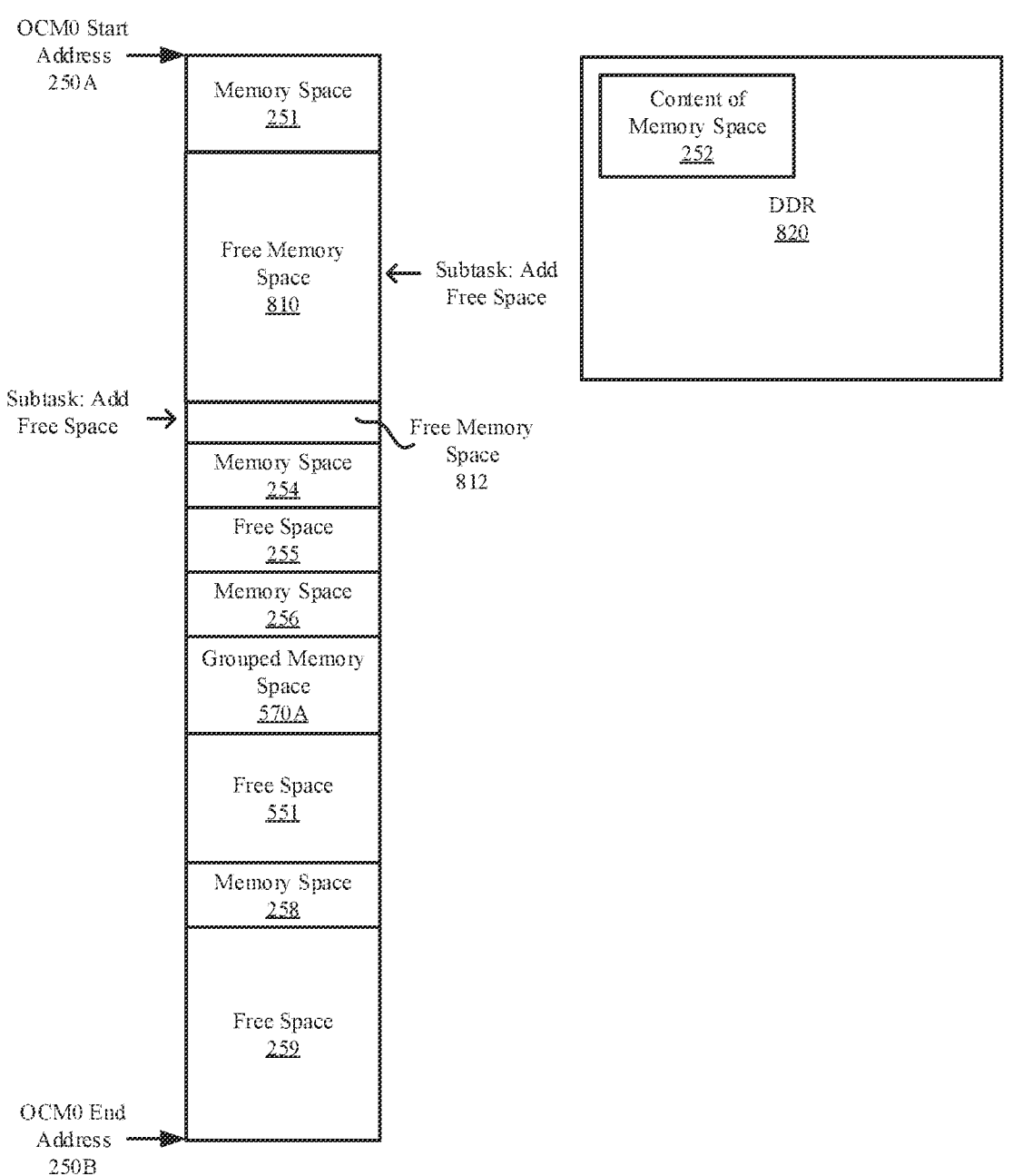

Referring now to FIG. 8C, the content of memory space 252 is stored in the DDR 820 and the subtask remove for memory space 252 is performed, similar to that described in FIGS. 6A-7E. Referring now to FIG. 8D, a remove subtask for free space 253 is performed, as described above. Referring now to FIG. 8E, new free space 810 is added to accommodate the free space 810. It is appreciated since the memory space 810 requires less space than released a residual free space 812 remains and added.

Figure 9:
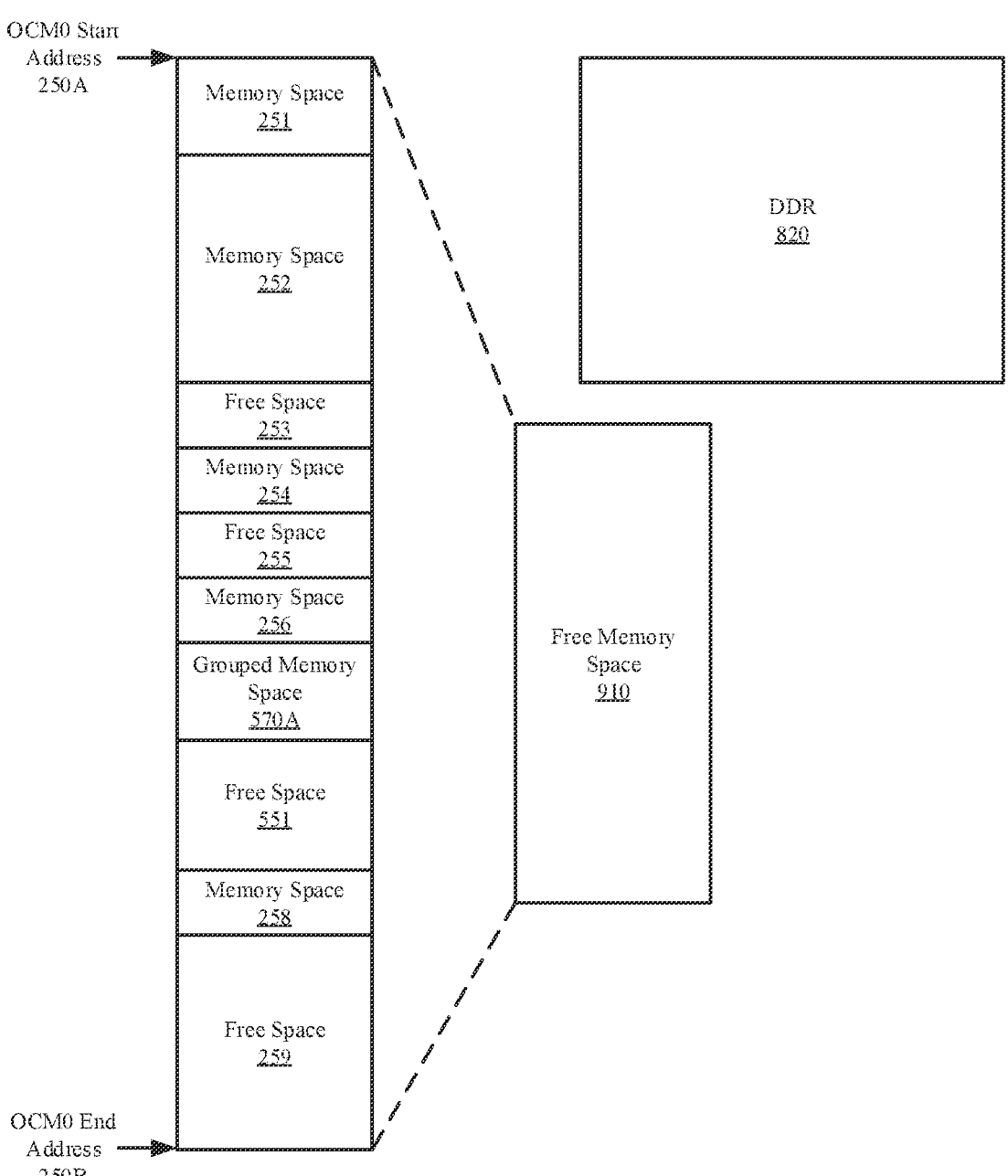
FIG. 9 depicts an example of freeing up memory in an ML hardware by prioritizing removal of content from non-grouped memory space according to one aspect of the present embodiments.

Referring now to FIG. 9, an example of freeing up memory in an ML hardware by prioritizing removal of content from non-grouped memory space according to one aspect of the present embodiments is depicted. Similar to FIG. 8A-8E, FIG. 9 is a continuation of FIG. 5A after the grouped memory space 570A is linked to another grouped memory space within another OCM of another processing tile. In this example, the compiler, e.g., the memory engine 230, may determine that additional memory space is needed, e.g., free memory space 910, in order to accommodate additional grouped memory space and linking with other OCMs or for a different reason. In this example, memory may be freed up in the OCM by moving data from the OCM to a secondary memory component, e.g., DDR 820, that is external to the ML hardware. It is appreciated that moving of non-grouped memory space to the external memory component is prioritized over grouped memory space. For example, in this illustration the grouped memory space 570A is moved to the DDR 820 as a last resort. In this example, the memory engine 230 determines that data from memory space 252, 254, and 256 should be moved to the DDR 820. As such, the memory engine 230 may cause the library 240 to insert an ISA into the primitive functions generated by the primitive code generator 220 to move the data from the memory spaces 252, 254, and 256 of that OCM to the DDR 820 and to remove data in free spaces 253 and 255 in order to accommodate a larger space needed for free space memory 910.

Figure 10:
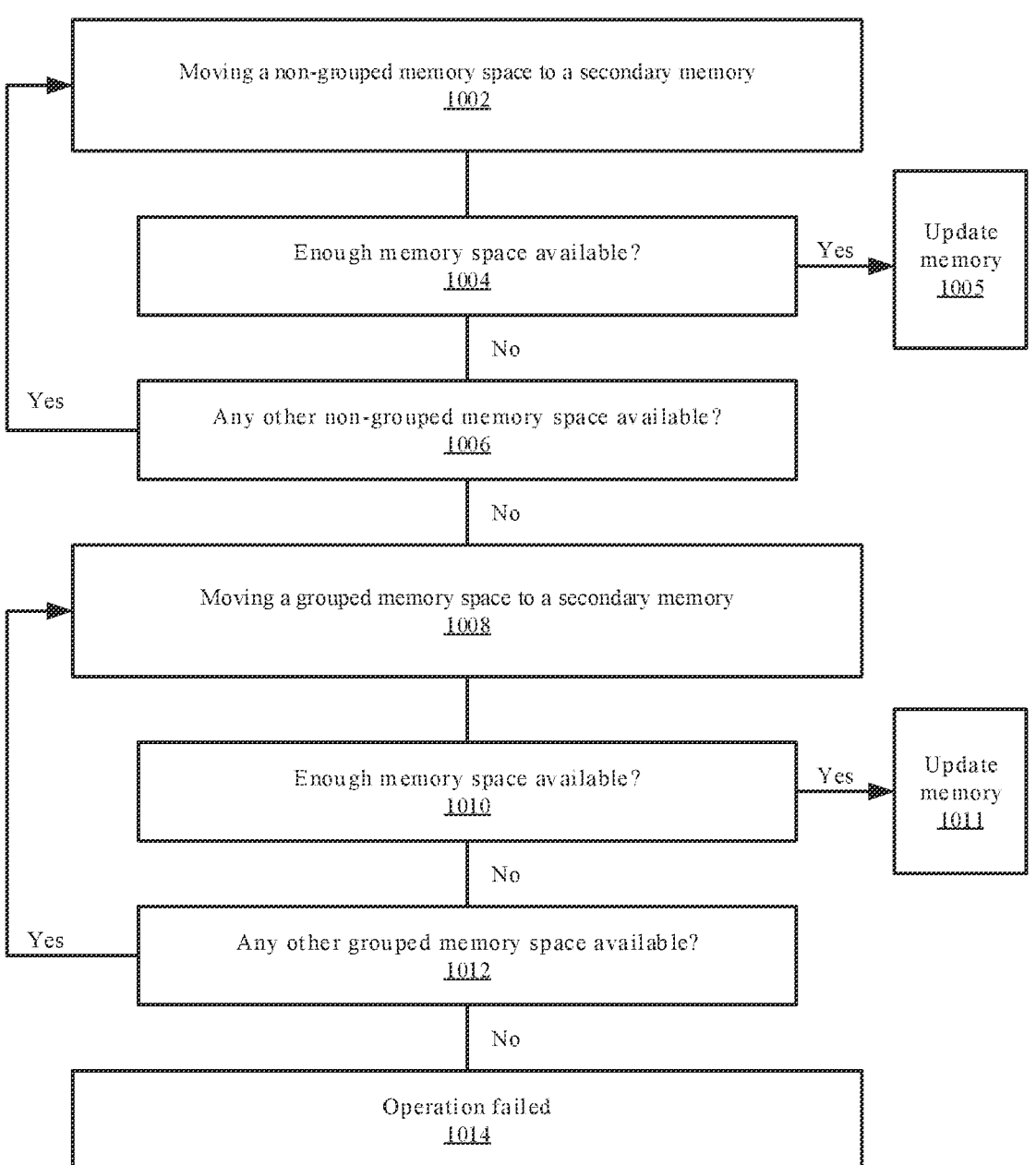
FIG. 10 depicts a flowchart of an example of freeing up memory space in an ML hardware according to one aspect of the present embodiments.

FIG. 10 depicts a flowchart of an example of freeing up memory space in an ML hardware according to one aspect of the present embodiments. At step 1002, a non-grouped memory space is moved to a secondary memory, e.g., DDR, that is external to the ML hardware, as described in FIGS. 8A-9. At step 1004, it is determined whether enough memory space is available, as described in FIGS. 8A-9. If enough space is available, then the memory may be updated at step 1005, as described in FIGS. 8A-9. However, if enough space is not available, then it is determined whether any other non-grouped memory space is available to be moved, at step 1006, as described in FIGS. 8A-9. If other non-grouped memory spaces are available then they are moved one at a time (in some examples) and the process in steps 1002-1006 is repeated until it is determined that there is enough space. However, if it is determined that there is not enough space available and if all non-grouped memory space are moved, then the process starts by moving a grouped memory space to the secondary memory, at step 1008, as described in FIGS. 8A-9. It is appreciated that moving a grouped memory space may be one at a time. At step 1010, it is determined whether enough memory space is available. If enough memory space is available, then the memory is update at step 1011, as described in FIGS. 8A-9. Otherwise, it is determined whether other grouped memory spaces are available, at step 1012. If other grouped memory spaces are available, then process repeats steps 100-1012 until there is enough memory space available. If there are no more grouped memory space available to be moved, then the operation is indicated as failed, at step 1014, as described in FIGS. 8A-9.

Figure 11:
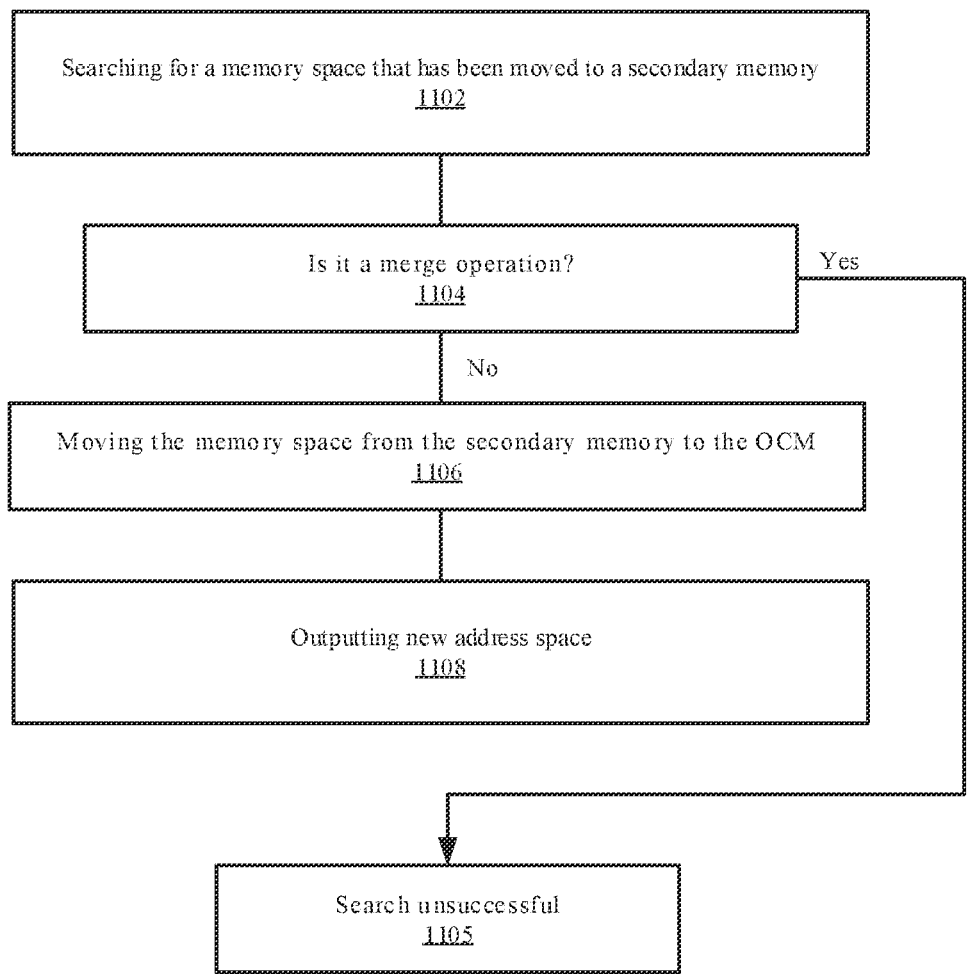
FIG. 11 shows a flowchart of an example of searching for data that has been moved to a secondary memory for a non/merge operation according to one aspect of the present embodiments.

FIG. 11 shows a flowchart of an example of searching for data that has been moved to a secondary memory for a non/merge operation according to one aspect of the present embodiments. At step 1102, a memory space that has been moved to a secondary memory is searched. At step 1104, it is determined whether there was a merge operation and if so then the search is unsuccessful (e.g., since it is a merge operation there is no need to bring it back to the OCM as slicing of merge can be done directly from the DDR itself), at step 1105. Otherwise, at step 1106, the memory space (i.e., content) from the secondary memory is moved to the OCM. At step 1108, the new address space result of the search is output.

Figure 12A:
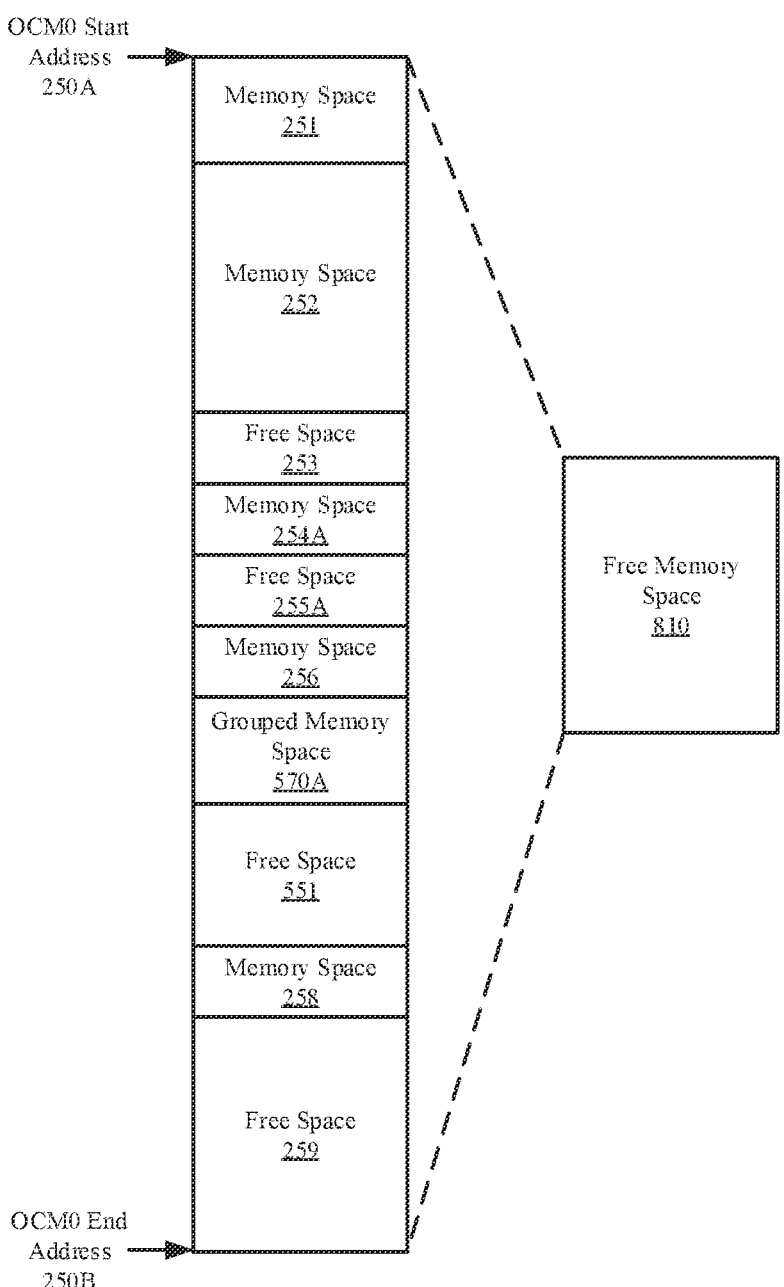
FIGS. 12A-12B depict an example of creating larger continuous memory space by moving memory spaces up/down according to one aspect of the present embodiments.
Figure 12B:
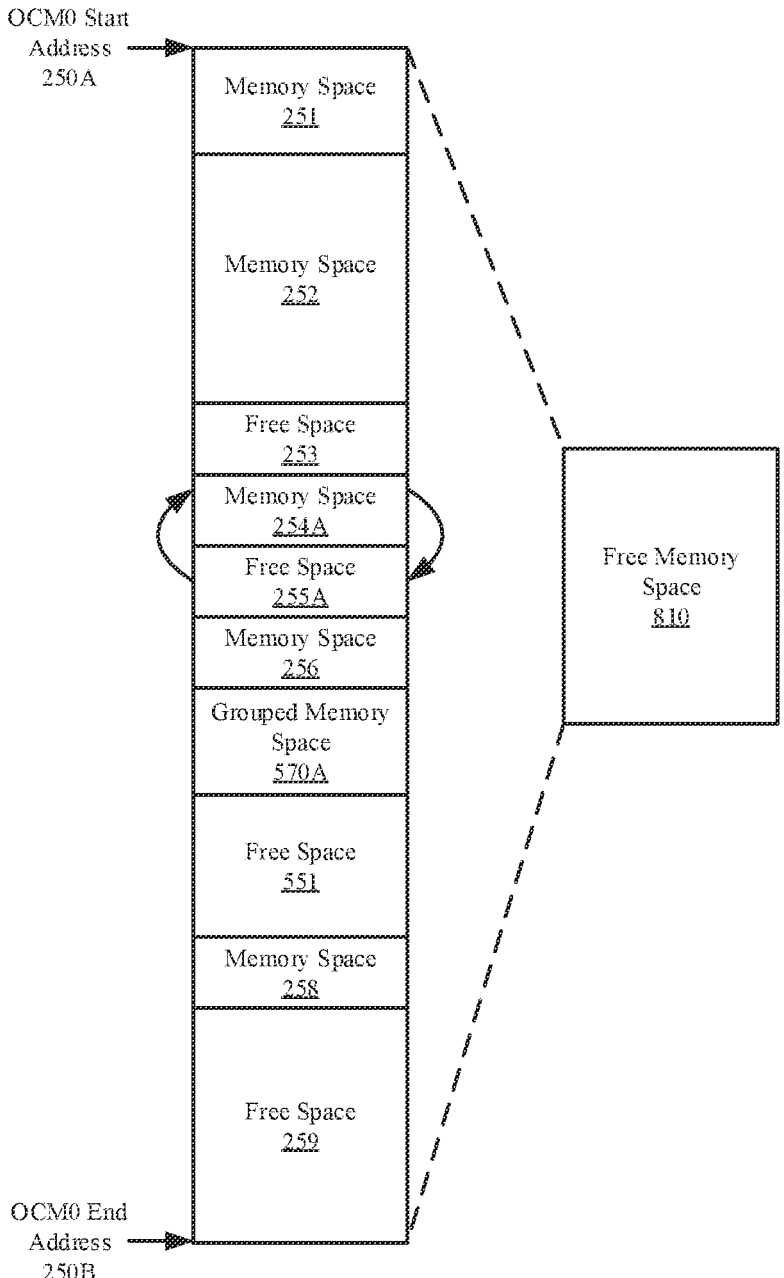

Referring now to FIGS. 12A-12B, an example of creating larger continuous memory space by moving or shifting memory spaces up/down according to one aspect of the present embodiments is shown. FIG. 12A is similar to that of FIG. 8A. However, in this example, to accommodate freeing up enough memory space 810, content within the OCM are moved. Referring now to FIG. 12B, moving the content from memory space 254A into free space 255A and moving the free space 255A to become adjacent to the free space 253 creates a larger available continuous free space. It is appreciated that this process may be repeated until there is enough available space to accommodate the free space memory 810. It is appreciated that moving content of memory space that are non-grouped memory space is prioritized over moving the content of memory spaces associated with grouped memory spaces.

It is appreciated that the reasons for prioritizing the moving of content from non-grouped memory space (whether internally within the OCM or externally to a DDR as an example) is because non-grouped memory space is independent of other OCMs and other processing tiles. In comparison since the grouped memory space in one OCM is tied to the grouped memory space in another OCM of another processing tile, what happens to one grouped memory space must happen to the other one that it is tied to and as such, other OCMs of other processing tiles must also be considered, which results in a more complex processing. As such, grouped memory space is used as a last resort.

Figure 13A:
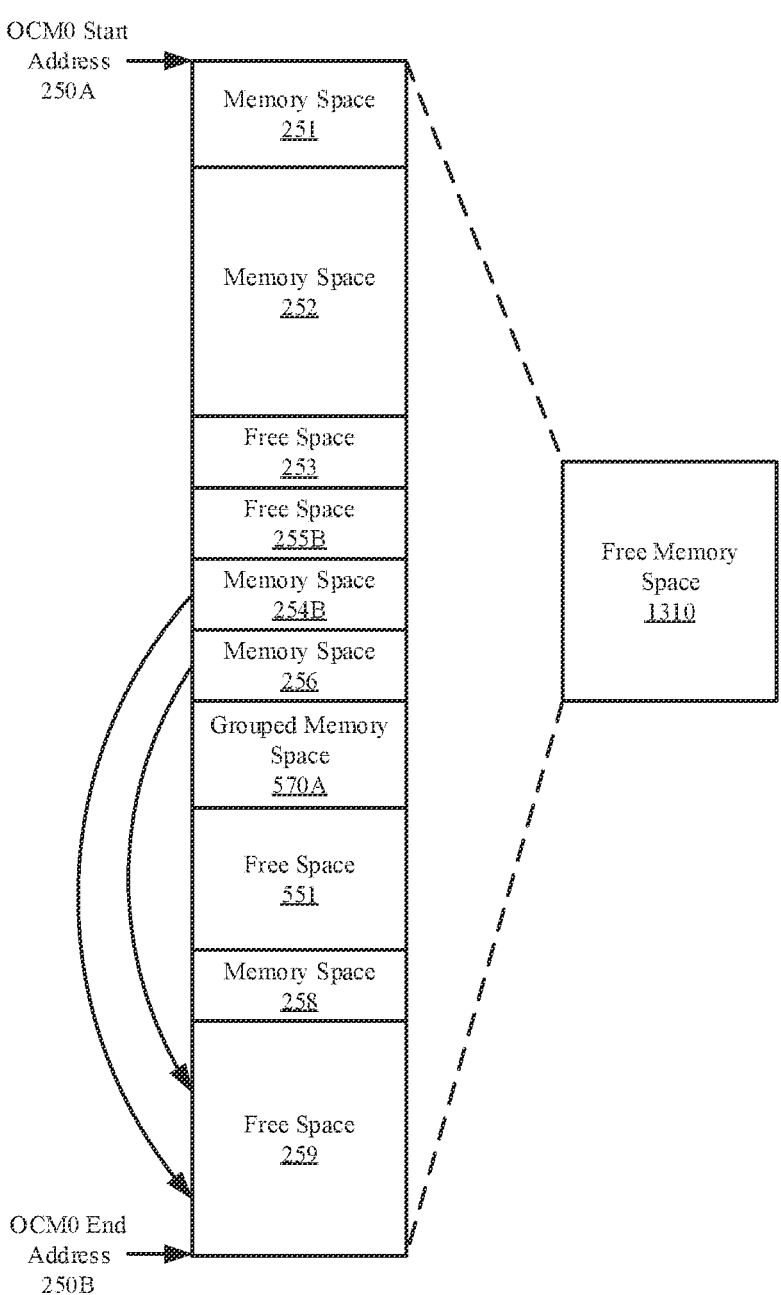
FIGS. 13A-13B depict an example of creating larger continuous memory space by rearranging memory spaces according to one aspect of the present embodiments.
Figure 13B:
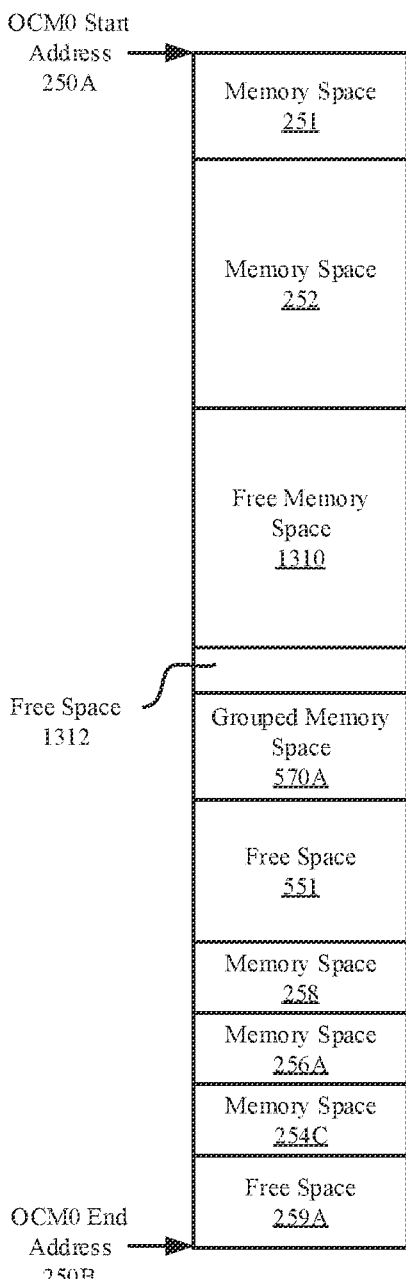

FIGS. 13A-13B depict an example of creating larger continuous memory space by rearranging memory spaces according to one aspect of the present embodiments. FIG. 13A is similar to that of FIG. 12B, except that content from memory space 254B and memory space 256 are moved to free space 259 in order to free up space adjacent to free space 253 and 255B to create a larger continuous free space. Referring now to FIG. 13B, the content from memory space 254B is moved to memory space 254C and the content from memory space 256 is moved to memory space 256A, leaving free space 259A out of the original free space 259. It is appreciated that free space 253, 255B and now space corresponding to memory space 254B and memory space 256 are now a new free space that can accommodate free memory space 1310 leaving free space 1312.

Figure 14:
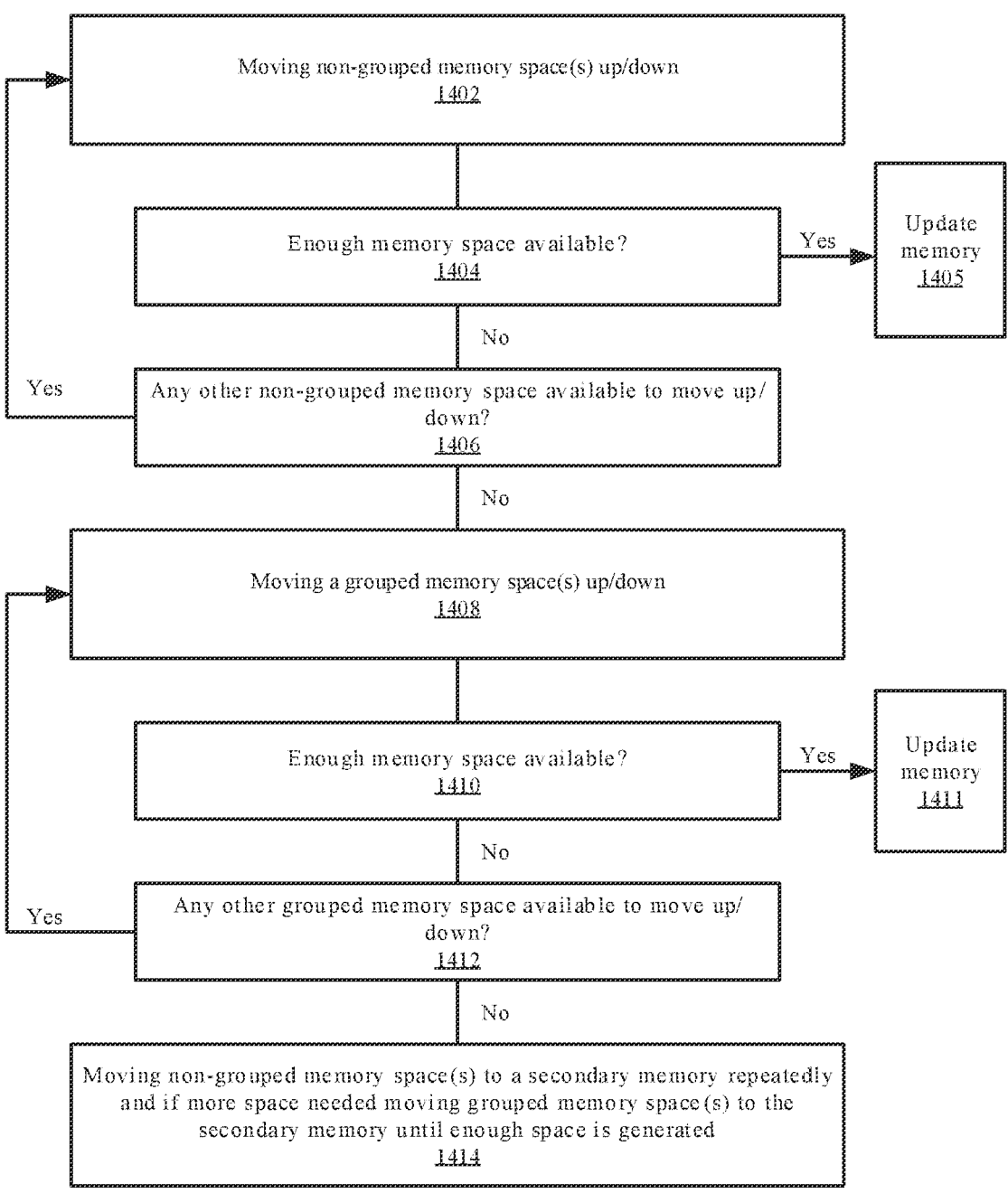
FIG. 14 shows a flowchart of an example of freeing up memory space by moving memory content based on priorities according to one aspect of the present embodiments.

FIG. 14 shows a flowchart of an example of freeing up memory space by moving memory content based on priorities according to one aspect of the present embodiments. At step 1402, non-grouped memory spaces (i.e., content) are moved up/down (it is appreciated that up/down refers to moving to higher/lower memory address space), as described above, to free up more memory space, as described in FIGS. 12A-13B. At step 1404, it is determined whether enough memory space is available, as described in FIGS. 12A-13B. If there is enough space available, then the memory is updated at step 1405, as described in FIGS. 12A-13B. Otherwise, it is determined whether there are other non-grouped memory space available where they can be moved up/down, in step 1406, as described in FIGS. 12A-13B. If the answer to step 1406 is yes, then the process in steps 1402-1406 is repeated until enough memory space is available and if none can become available after all non-grouped memory spaces are exhausted then grouped memory spaces (i.e., content) can be moved up/down as needed, in step 1408, as described in FIGS. 12A-13B. It is appreciated that one grouped memory space at the time may be moved up/down. At step 1410, it is determined whether there is enough memory space available, as described in FIGS. 12A-13B. If enough memory space is available, then the memory is updated at step 1411, as described in FIGS. 12A-13B. Otherwise, it is determined whether there are other grouped memory spaces available to be moved up/down to free up more space. If so, then the process in steps 1408-1412 is repeated until enough memory space is available. However, if the grouped memory space is also exhausted and there is still not enough space available, then one or more non-grouped memory space(s) may be moved to a secondary memory repeatedly until there is enough space available, at step 1414, as described in FIGS. 12A-13B. If there is still not enough space available after non-grouped memory space(s) are exhausted, then the grouped memory spaces may be moved to the secondary memory repeatedly until enough memory space becomes available, at step 1414, as described in FIGS. 12A-13B. It is appreciated, that again moving non-grouped memory space up/down or to a secondary memory is prioritized over the grouped memory space, for reasons described above.

Figure 15A:
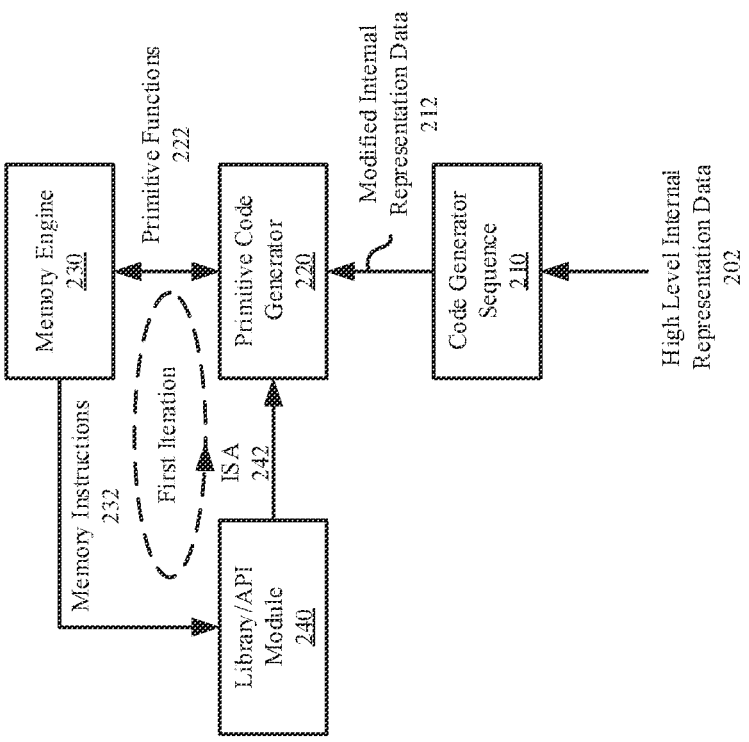
FIG. 15A depicts an example of deallocating a memory space when a tensor data is no longer needed in a first iteration of the compiler according to one aspect of the present embodiments.
Figure 15B:
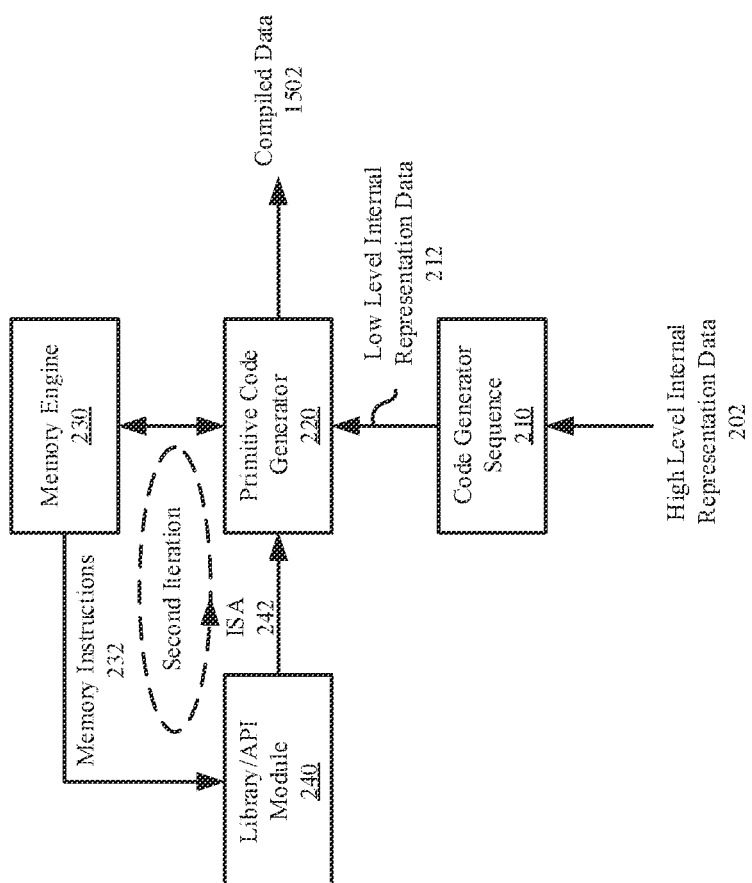
FIG. 15B depicts an example of deallocating a memory space when a tensor data is no longer need in a second iteration of the compiler according to one aspect of the present embodiments.

FIG. 15A depicts an example of deallocating a memory space when a tensor data is no longer needed in a first iteration of the compiler according to one aspect of the present embodiments. FIG. 15A is similar to that of FIG. 2A. It is appreciated that in this nonlimiting example, during a first iteration by the compiler, the modified IR data 212 is sent to the primitive code generator 220 which generates the primitive functions 222. It is appreciated that an allocation list may be generated based on the primitive functions. It is appreciated that the memory engine 230 may determine one or more memory space associated with a tensor data that can be deallocated because it is no longer needed. In other words, the memory engine 230 may time the deallocation of the memory space such that it occurs after the tensor data is no longer needed, and by deallocating the memory space more space is freed up that can be used for other tensor data and storage thereof. It is appreciated that when deallocation occurs, the memory tensor is deleted from the memory management system record and can be overwritten by other data, as described above. In one nonlimiting example, the memory engine 230 may cause the library/API module 240 to insert an appropriate ISA instruction into the primitive functions generated by the primitive code generator 220 in order to deallocate the memory space associated with the identified tensor data. During the second iteration, as shown in FIG. 15B, by the compiler the primitive code generator 220 updates the primitive functions to include the deallocation function (as inserted in the appropriate location and sequence) to remove the memory space associated with the tensor data that is no longer needed. The primitive code generator 220 may subsequently generate the low-level instructions, e.g., binary code, as compiled data 1502. The compiled data 1502 may be transmitted from the compiler to the ML hardware for execution. An example of the generated allocation list is shown in FIG. 15C.

FIG. 16 is a flowchart of an example for determining whether certain memory spaces from different processing tiles can be linked and memory management associated therewith according to one aspect of the present embodiments. At step 1602, an ML network model comprising a plurality of ML operations in high-level code is received. At step 1604, optionally the ML network model is partitioned into a plurality of sub-graphs. At step 1606, an IR for each sub-graph of the plurality of sub-graphs is generated, wherein the IR is mapped to one or more components in a multi-processing tile device. At step 1608, two more processing tiles of the multi-processing tile device having a same dimension for an input tensor data as one another performing a same primitive function based on the IR are identified. At step 1610, the two more processing tiles of the multi-processing tile device are determined to have a same dimension for their respective output tensor data for the same primitive function based on the IR. At step 1612, responsive to determining that the two or more processing tiles have the same dimension for their respective output tensor data for the same primitive function, a same memory address range within a respective OCM of the two or more processing tiles for the same primitive function is allocated. At step 1614, the memory address range within the respective OCM of the two or more processing tiles to one another to form a grouped memory space within the respective OCM of the two or more processing tiles is linked. At step 1616, the each sub-graph of the plurality of sub-graphs is compiled based on the linking to generate low-level instructions.

In one nonlimiting example, the method may further include shifting the grouped memory space within the first OCM and the second OCM in synchronous with one another and with a same value. In some nonlimiting examples, the method may further include moving the grouped memory space within the first OCM to a new memory address range within the first OCM; and moving the grouped memory space within the second OCM to the new memory address range within the second OCM, wherein the moving within the first OCM and the second OCM are synchronize with one another.

It is appreciated that in some embodiments, the method further includes storing a first tensor data in the grouped memory space within the first OCM and a second tensor data in the grouped memory space within the second OCM, wherein the first tensor data is associated with the same primitive function, and wherein the second tensor data is associated with the same primitive function. It is appreciated that in some embodiments, the method further includes moving the first tensor data from the grouped memory space within the first OCM to a secondary memory component that is external to the multi-processing tile device; and moving the second tensor data from the grouped memory space within the second OCM to the secondary memory component, wherein the moving of the first tensor data and the second tensor data are synchronized with one another.

According to some embodiments, the method further includes searching the grouped memory space after it has been moved to the secondary memory component; and responsive to determining absence of a merge operation, moving the first tensor data and the second tensor data from the secondary memory to the first OCM and the second OCM respectively.

It is appreciated that in some embodiments, the method may further include responsive to determining that the two or more processing tiles have the same dimension for their respective output tensor data for the same primitive function and prior to the linking, determining whether the first OCM has enough continuous memory space to accommodate the same memory address range; and responsive to determining that the first OCM does not have enough continuous memory space to accommodate the same memory address range, freeing up memory space within the first OCM. According to some embodiments, freeing up memory space includes moving content from an occupied memory space in the first OCM to a secondary memory component that is external to the multi-processing tile device. In some embodiments, non-grouped memory space within the first OCM is prioritize for the moving content from the occupied memory space to the secondary memory component over one or more grouped memory space. It is appreciated that in some embodiments, another grouped memory space within the first OCM is moved from the first OCM to the secondary memory component after the non-grouped memory space within the first OCM is moved to the secondary memory component and further in response to determining the more memory space is required. It is appreciated that the non-grouped memory space in the first OCM that is adjacent to a free memory space is prioritized for the moving over another non-grouped memory space that is not adjacent to a free memory space.

According to some embodiments, the freeing up memory space includes removing content from an occupied memory space in the first OCM (i.e., clearing record of the tensor data from the memory management system, thereby enabling the memory space to be overwritten). According to one non-limiting example, the removed content is within a non-grouped memory space within the first OCM. According to some embodiments, the non-grouped memory space within the first OCM is adjacent to a free memory space within the first OCM. It is appreciated that in some embodiments, the freeing up memory space includes moving memory spaces up or down within the first OCM to create a larger continuous free memory space range. In some embodiments, non-grouped memory space within the first OCM is prioritize for the moving over one or more grouped memory space.

It is appreciated that in some embodiments, the method further includes removing the link between the grouped memory space within the each processing tile of the two or more processing tiles (e.g., when the memory spaces are being deallocated). According to one nonlimiting example, the method further includes deleting a content stored within the grouped memory space within one processing tile of the two or more processing tiles after the removing the link.

It is appreciated that in some embodiments, the data may be relocated to a free memory space within another OCM of another processing tile instead of being relocated to the DDR, as described above. Free memory space within an OCM of different processing tiles may be used and is described in more detail in the U.S. patent application Ser. No. 17/966,380, filed on Oct. 14, 2022, which is incorporated herein by reference in its entirety.

FIG. 17 is a flowchart of an example for deallocating a memory space when a tensor data is no longer needed according to one aspect of the present embodiments. At step 1702, in a first iteration of code generation an ML network model comprising a plurality of ML operations in high-level code is received. At step 1704, an IR for the ML network model is generated, wherein the IR is mapped to one or more components in a multi-processing tile device. At step 1706, one or more primitive functions is generated based on the IR. At step 1708, an allocation list is generated based on the one or more primitive functions. At step 1710, it is determined when a tensor data within the allocation list is no longer needed. At step 1712, a deallocation function is inserted that is associated with the tensor data to the one or more primitive functions to form updated primitive functions, wherein the inserting frees up a memory space associated with the tensor data when the tensor is no longer needed. In a second iteration, at step 1714, a compilation of the updated primitive functions is generated that maps the IR to the one or more components in the multi-processing device, wherein the compilation is a low-level instructions. It is appreciated that step 1714 may occur during the matching nodes of the IR in the second iteration.

It is appreciated that in some embodiments, the first iteration and the second iteration occur within an AOT compiler. It is appreciated that in some embodiments, a code may be inserted after the deallocation function is inserted, wherein the code is configured to check whether de-allocation of the one or more memory space has occurred.

It is appreciated that in some embodiments, the allocation list includes one or more of model input tensor data, model output tensor data, model constant tensor data, an input activation tensor data, an output activation tensor data, and an intermediate tensor data. In some embodiments, the low-level instructions is transmitted to the multi-processing tile device. It is appreciated that in some embodiments, the deallocation function removes data associated with the tensor data that is no longer needed.

It is appreciated that the embodiments as described above may be further leveraged to optimize the compilation to achieve an improved compiler time by reducing or eliminating the number of memory allocation/deallocation at the execution runtime of the model, as an example. According to some embodiments, a two iteration approach for compilation, similar to that of FIGS. 15A-15C may be used to reduce the number of memory allocation/deallocation.

During a first iteration, the memory footprint of the ML model, allocation sequence of each graph node, and sizes of memory regions in the compiler time may be determined. During a second iteration, the compiler may utilize the captured/determined information from the first iteration in order to generate the code (e.g., assembly code) for graph nodes that optimizes the use of new memory allocation sequence for the graph nodes, In the second iteration, the compiler aims to free a larger memory segment using the new allocation sequence, thereby eliminating the need to re-allocate memory space during inference execution runtime. As such, execution runtime is reduced.

A nonlimiting example is provided to illustrate the operations during compilation. During the first iteration, the compiler may capture/determine the allocation sequence, the size for output of graph node L1-Conv, all memory regions of graph node L2-Conv, and a large region of graph node L-Conv. The memory footprint, allocation sequence (from top to down), and the sizes of allocation during the first iteration is shown below for illustration purposes only.

| Memory Space Name | Size (Bytes) |
|---|---|
| L1_out | 74240 |
| L2_flat | 76032 |
| L2_weight | 239616 |
| L2_bias | 448 |
| L2_out | 33280 |
| L3_big | 640000 |

It is appreciated L1_out is preserved from L1-Conv to be used later in L5. It is appreciated that before L3 convolution, the memory may need to be deallocated first in order to accommodate the memory size needed for L3. As such, during the first iteration, the compiler may deallocate L2_flat, deallocate L2_weight, and deallocate L2 bias.

It is appreciated that during the second iteration, as described in FIGS. 15A-15C, the allocation/deallocation sequence of memory may be illustrated as shown below:

| Mem Space name | begin_addr | end_addr | hex sise | dec size in bytes |
|---|---|---|---|---|
| L1_out | 0x0 | 0x121ff | 0x12200 | 74240 bytes |
| L2_flat | 0x12200 | 0x24aff | 0x25200 | 152063 bytes |
| L2_weight | 0x37400 | 0x71bff | 0x3a800 | 239616 bytes |
| L2_bias | 0x71c00 | 0x71dbf | 0x1c0 | 448 bytes |
| L2_out | 0x71dc0 | 3x79fbf | 0x8200 | 33280 bytes |
| Free_segment_A | 0x79fc0 | 0xfffff | 8x86040 | 548928 bytes |

It is appreciated that the compiler may generate the assembly code to perform convolution for layer 2, i.e., L2-Con and save the results in L2-out. Subsequently, the compiler may deallocated three unused region that are no longer in use as shown below as a nonlimiting example:

| Mem Space name | begin_addr | end_addr | hex size | dec size in bytes |
|---|---|---|---|---|
| L1_out | 0x0 | 0x121ff | 0x12200 | 74240 bytes |
| Free_segment_B | 0x12200 | 0x71dbf | 0x5fbc0 | 392128 bytes |
| L2_out | 0x71dc0 | 0x79fbf | 0x8200 | 33280 bytes |
| Free_segment_A | 0x79fc0 | 0xfffff | 0x86040 | 548928 bytes |

As illustrated, the compiler may allocate the freed space to accommodate the computation for layer 3, i.e., L3. The compiler is aware that two memory segments size 392128 and 548928 bytes are free and that these memory segments individually cannot store the amount of data for L3 computation which needs 640000 bytes, as an example. Accordingly, the compiler may reallocate L2_out toward the L1_out region in order to merge Free_segment_B and Free_segment_A into a much larger Free_segment_C in order to store data for L3, as illustrate below.

| Mem Space name | begin_addr | end_addr | hex size | dec size in bytes |
|---|---|---|---|---|
| L1_out | 0x0 | 0x1218f | 0x12200 | 74240 bytes |
| L2_out | 0x12200 | 0x1a3ff | 0x8200 | 33280 bytes |
| Free_segment_A | 0x1a400 | 0xfffff | 0xe5c00 | 941056 bytes |

It is appreciated that the inference will run slower, when the compiler generates the assembly code to perform the operations described above to accommodate memory storage needed for L3 computation and storing, because there is an additional time needed to re-allocate L2_out. However, the compiler may instead leverage the determined/captured information during the first iteration (e.g., allocation steps, sizes, deallocation steps, etc.) to predict the memory utilization given the actual OCM size. In this particular example, the compiler has knowledge of the Free-segment can become by optimizing the allocation sequence. For the example provided above and for illustration purposes only, the compiler may allocate L2_out first and before L2_flat during the second iteration as illustrated below:

| Mem Space Name | Size in bytes |
|---|---|
| L1_out | 74240 bytes |
| L2_out | 33280 bytes |
| L2_flat | 76032 bytes |
| L2_weight | 239616 bytes |
| L2_bias | 448 bytes |

It is appreciated that before L3 convolution, the memory may need to be deallocated first in order to accommodate the memory size needed for L3. As such, the compiler may deallocate L2_flat, deallocate L2_weight, and deallocate L2_bias, as described above. It is appreciated that the optimization of allocation sequence performed by the compiler for a given model graph, e.g., node L2-Conv in this example, results in a new memory footprint as shown below that may no longer need re-allocation to be performed during inference runtime:

| Mem Space name | begin_addr | end_addr | hex size | dec size in bytes |
|---|---|---|---|---|
| L1_out | 0x0 | 0x121ff | 0x12200 | 74240 bytes |
| L2_out | 0x12200 | 0x1a3ff | 0x8200 | 33280 bytes |
| L2_flat | 0x1a400 | 0x3f5ff | 0x25200 | 152063 bytes |
| L2_weight | 0x3f600 | 0x79dff | 0x3a800 | 239616 bytes |
| L2_bias | 0x7Se00 | 0x79fbf | 0x1c0 | 448 bytes |
| Free_segment_A | 0x79fc0 | 0xfffff | 0x86040 | 548928 bytes |

As another example, the optimization may be illustrated as shown below:

| Mem Space name | begin_addr | end_addr | hex size | dec size in bytes |
|---|---|---|---|---|
| L1_out | 0x0 | 0x121ff | 0x12200 | 74240 bytes |
| L2_out | 0x12200 | 0x1a3ff | 0x8200 | 33280 bytes |
| Free_segment_C | 0x1a400 | 0xfffff | 0xe5c00 | 941056 bytes |

In other words, the compiler may use the captured information from the first iteration to predict the memory utilization for the given OCM sizes. Based on that prediction, the compiler may optimize the allocation sequence to reduce the number of re-allocation, thereby improving runtime speed.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A computer-implemented method comprising:

in a first iteration of code generation:

receiving a machine learning (ML) network model comprising a plurality of ML operations in high-level code;

partitioning the ML network model into a plurality of sub-graphs;

generating an internal representation (IR) for each sub-graph of the plurality of sub-graphs, wherein the IR is mapped to one or more components in a multi-processing tile device;

generating one or more primitive functions based on the IR;

generating an allocation list based on the one or more primitive functions;

determining one or more memory space within the multi-processing tile device associated with a tensor data that can be deallocated and timing associated therewith, wherein the determining is based on the allocation list; and inserting a deallocation function to the one or more primitive functions to deallocated the one or more memory space, wherein location of the deallocation function within the primitive functions is based on the timing, and wherein an updated primitive functions is formed; and in a second iteration of the code generation:

generating a compilation of the updated primitive functions to map the IR to the one or more components in a multi-processing device.

2. The compiler implemented method of claim 1, wherein the first iteration and the second iteration occur within an ahead of time (AOT) compiler.

3. The compiler implemented method of claim 1 further comprising inserting a code after the deallocation function is inserted, wherein the code is configured to check whether de-allocation of the one or more memory space has occurred.

4. The compiler implemented method of claim 1, wherein the allocation list includes one or more of model input tensor data, model output tensor data, model constant tensor data, an input activation tensor data, an output activation tensor data, and an intermediate tensor data.

5. The compiler implemented method of claim 1, wherein the deallocation function frees up space in the one or more memory space.

6. The compiler implemented method of claim 5, wherein the one or more memory space is an on-chip memory (OCM) of a processing tile within the multi-processing device.

7. The compiler implemented method of claim 6, wherein the multi-processing device comprises a plurality of processing tiles, wherein each processing tile of the plurality of processing tiles includes a plurality of processing elements and its dedicated OCM.

8. The compiler implemented method of claim 1, wherein the compilation of the updated primitive functions that map the IR to the one or more components in the multi-processing device generates low-level instructions, wherein the method further comprises transmitting the low-level instructions to the multi-processing tile device.

9. The compiler implemented method of claim 1, wherein the deallocation function removes data associated with the tensor data to free up memory space within the multi-processing tile device.

10. A method comprising:

in a first iteration of code generation:

receiving a machine learning (ML) network model comprising a plurality of ML operations in high-level code;

generating an internal representation (IR) for the ML network model, wherein the IR is mapped to one or more components in a multi-processing tile device;

generating one or more primitive functions based on the IR;

generating an allocation list based on the one or more primitive functions;

determining when a tensor data within the allocation list is no longer needed; and inserting a deallocation function associated with the tensor data to the one or more primitive functions to form an updated primitive functions, wherein the inserting frees up a memory space associated with the tensor data when the tensor is no longer needed; and in a second iteration:

generating a compilation of the updated primitive functions to map the IR to the one or more components in the multi-processing device.

11. The method of claim 10, wherein the first iteration and the second iteration occur within an ahead of time (AOT) compiler.

12. The method of claim 10 further comprising inserting a code after the deallocation function is inserted, wherein the code is configured to check whether de-allocation of the one or more memory space has occurred.

13. The method of claim 10, wherein the allocation list includes one or more of model input tensor data, model output tensor data, model constant tensor data, an input activation tensor data, an output activation tensor data, and an intermediate tensor data.

14. The method of claim 10, wherein the memory space is an on-chip memory (OCM) of a processing tile within the multi-processing device.

15. The method of claim 14, wherein the multi-processing device comprises a plurality of processing tiles, wherein each processing tile of the plurality of processing tiles includes a plurality of processing elements and its dedicated OCM.

16. The method of claim 10, wherein the compilation of the updated primitive functions to map the IR to the one or more components in the multi-processing device generates low-level instruction, and wherein the method further comprises transmitting the low-level instructions to the multi-processing tile device.

17. The method of claim 10, wherein the deallocation function removes data associated with the tensor data that is no longer needed.

18. A system comprising:

a compiler comprising:

a code generator sequence engine configured to:

receive a machine learning (ML) network model comprising a plurality of ML operations in high-level code; and generate an internal representation (IR) for the ML network model, wherein the IR is mapped to one or more components in a multi-processing tile device;

a primitive code generator in a first iteration configured to generate one or more primitive functions based on the IR and wherein the primitive code generator is further configured to generate an allocation list based on the one or more primitive functions;

a memory engine in the first iteration configured to receive the allocation list from the primitive code generator and determine when a tensor data within the allocation list is no longer needed; and a library module in the first iteration configured to receive the allocation list from the memory engine and wherein the library module is configured to generate one or more instruction set architecture (ISA) based on the allocation list, wherein the memory engine in the first iteration is further configured to cause the library module to generate an ISA to deallocate the tensor data when the tensor data is no longer needed, wherein the memory engine in the first iteration is further configured to cause the primitive code generator to insert the generate ISA to the one or more primitive functions to form an updated primitive functions, wherein the inserting deallocate a memory space associated with the tensor data when the tensor data is no longer needed, wherein the primitive code generator in a second iteration is configured to generate a compilation of the updated primitive functions to map the IR to the one or more components in the multi-processing device.

19. The system of claim 18, wherein the compiler is an ahead of time (AOT) compiler.

20. The system of claim 18, wherein the memory engine is further configured to cause the library module to generate another ISA and for the primitive code generator to insert the another ISA after the generated ISA to deallocate the memory space to check whether de-allocation of the one or more memory space has occurred.

21. The system of claim 18, wherein the allocation list includes one or more of model input tensor data, model output tensor data, model constant tensor data, an input activation tensor data, an output activation tensor data, and an intermediate tensor data.

22. The system of claim 18, wherein the memory space is an on-chip memory (OCM) of a processing tile within the multi-processing device.

23. The system of claim 22, wherein the multi-processing device comprises a plurality of processing tiles, wherein each processing tile of the plurality of processing tiles includes a plurality of processing elements and its dedicated OCM.

24. The system of claim 18, wherein the primitive code generator generates low level instructions and wherein the primitive code generator is further configured to transmit the low-level instructions to the multi-processing tile device.

25. The system of claim 18, wherein the insertion of the ISA to deallocate the memory space removes data associated with the tensor data that is no longer needed.

26. A method comprising:
in a first iteration of code generation:
    receiving a machine learning (ML) network model comprising a plurality of ML operations in high-level code;
    generating an internal representation (IR) for the ML network model, wherein the IR is mapped to one or more components in a multi-processing tile device;
    generating one or more primitive functions based on the IR;
    generating a memory footprint of the ML network model;
    generating an allocation list based on the one or more primitive functions; and determining sizes of memory regions associated with the ML network mode; and
in a second iteration:
    predicting a memory utilization for a given memory size within a given processing tile based on the memory footprint and further based on the sizes of memory regions;
    changing a sequence associated with the allocation list based on the predicting to reduce a number of re-allocation; and
    generating a compilation of the updated primitive functions to map the IR to the one or more components in the multi-processing device based on the changing.

27. The method of claim 26, wherein the first iteration and the second iteration occur within an ahead of time (AOT) compiler.

28. The method of claim 26, wherein the allocation list includes one or more of model input tensor data, model output tensor data, model constant tensor data, an input activation tensor data, an output activation tensor data, and an intermediate tensor data.

29. The method of claim 26, wherein the memory space is an on-chip memory (OCM) of a processing tile within the multi-processing device.

30. The method of claim 29, wherein the multi-processing device comprises a plurality of processing tiles, wherein each processing tile of the plurality of processing tiles includes a plurality of processing elements and its dedicated OCM.

31. The method of claim 26, wherein the compilation of the updated primitive functions to map the IR to the one or more components in the multi-processing device generates low-level instructions, wherein the method further comprises transmitting the low-level instructions to the multi-processing tile device.

* * * * *